(12) United States Patent
Huang et al.

(10) Patent No.: US 11,708,481 B2
(45) Date of Patent: Jul. 25, 2023

(54) SOLUTION COMPRISING AN ASSOCIATIVE POLYMER AND A CYCLODEXTRIN POLYMER

(71) Applicant: ECOLAB USA INC., St. Paul, MN (US)

(72) Inventors: Heqing Huang, Naperville, IL (US); Mingli Wei, Naperville, IL (US); Xiaodong Huang, Aurora, IL (US); Jianwei Yuan, Aurora, IL (US); David Jordan, Evanston, IL (US); Weiguo Cheng, Naperville, IL (US)

(73) Assignee: ECOLAB USA INC., St. Paul, MN (US)

( * ) Notice: Subject to any disclaimer, the term of this patent is extended or adjusted under 35 U.S.C. 154(b) by 0 days.

(21) Appl. No.: 16/772,737

(22) PCT Filed: Dec. 13, 2018

(86) PCT No.: PCT/US2018/065358
§ 371 (c)(1),
(2) Date: Jun. 12, 2020

(87) PCT Pub. No.: WO2019/118675
PCT Pub. Date: Jun. 20, 2019

(65) Prior Publication Data
US 2021/0230400 A1 Jul. 29, 2021

Related U.S. Application Data

(60) Provisional application No. 62/598,060, filed on Dec. 13, 2017.

(51) Int. Cl.
*C08L 5/16* (2006.01)
(52) U.S. Cl.
CPC ........................... *C08L 5/16* (2013.01)
(58) Field of Classification Search
CPC .................................................... C08L 5/16
See application file for complete search history.

(56) References Cited

U.S. PATENT DOCUMENTS

| | | |
|---|---|---|
| 3,872,039 A | 3/1975 | Vaughn et al. |
| 3,875,098 A | 4/1975 | Sedlak |
| 4,115,187 A | 9/1978 | Davidson |
| 4,217,425 A | 8/1980 | Ballweber et al. |
| 4,392,917 A | 7/1983 | Lipowski et al. |
| 4,426,485 A | 1/1984 | Hoy et al. |
| 4,427,821 A | 1/1984 | Fong et al. |
| 4,535,098 A | 8/1985 | Evani et al. |
| 4,599,390 A | 7/1986 | Fan et al. |
| 4,713,431 A | 12/1987 | Bhattacharyya et al. |
| 4,744,864 A | 5/1988 | Deets et al. |
| 4,795,531 A | 1/1989 | Sofia et al. |
| 4,835,206 A | 5/1989 | Farrar et al. |
| 4,835,234 A | 5/1989 | Valint et al. |
| 4,874,588 A | 10/1989 | Sortwell et al. |
| 4,921,903 A | 5/1990 | Fong |
| 5,137,571 A * | 8/1992 | Eisenhart ............... C09D 5/024 524/48 |
| 5,221,435 A | 6/1993 | Smith, Jr. |
| 5,234,604 A | 8/1993 | Liao et al. |
| 5,252,692 A | 10/1993 | Lovy et al. |
| 5,435,922 A | 7/1995 | Ramesh et al. |
| 5,541,252 A | 7/1996 | Schmitt et al. |
| 5,942,573 A | 8/1999 | Doki et al. |
| 5,980,878 A | 11/1999 | Torgerson et al. |
| 6,100,322 A | 8/2000 | Persson et al. |
| 6,228,217 B1 | 5/2001 | Dickerson et al. |
| 6,274,667 B1 | 8/2001 | Shannon et al. |
| 6,365,667 B1 | 4/2002 | Shannon et al. |
| 6,406,593 B1 | 6/2002 | Heard et al. |
| 6,960,617 B2 | 11/2005 | Omidian et al. |
| 7,442,280 B1 | 10/2008 | Klemets et al. |

(Continued)

FOREIGN PATENT DOCUMENTS

| | | |
|---|---|---|
| CN | 101942779 | 1/2011 |
| CN | 102154943 | 8/2011 |

(Continued)

OTHER PUBLICATIONS

G. Pouliquen et al., "Photoresponsive Viscosity and Host-Guest Association in Aqueous Mixtures of Poly-Cyclodextrin with Azobenzene-Modified Poly(acrylic)acid," 111 J. Phys. Chem. B 5587-95 (2007). (Year: 2007).*
International Search Report for PCT/US2017/036996, dated Sep. 14, 2017, 5 pages.
International Search Report for PCT/US2018/044562, dated Nov. 7, 2018, 5 pages.
International Search Report and Written Opinion for PCT/US2018/065358, dated Mar. 21, 2019, 11 pages.
Abson, Derek et al., "Wet-end behavior of dry strength additives," Tappi Journal, vol. 68(1), pp. 76-78 (Jan. 1985).
Daoud-Mahammed, S. et al. "Original tamoxifen-loaded gels containing cyclodextrins: in situ self-assembling systems for cancer treatment," Journal Drug Delivery Science Technology, vol. 14(1), pp. 51-55 (2004).

(Continued)

*Primary Examiner* — Michael F Pepitone
(74) *Attorney, Agent, or Firm* — Eric D. Babych; Barnes & Thornburg LLP

(57) ABSTRACT

A solution including an associative polymer, a cyclodextrin polymer, and a solvent is provided. The associative polymer is a powder in the absence of the solvent. Additionally, a method of making down an associative polymer powder to form a solution is provided. The method includes blending a mixture of the powder, a cyclodextrin polymer, and a solvent to yield the solution, wherein the powder includes particles having been dry-cut to a median particle size of from about 200 microns to about 10,000 microns. Additionally, a powder product is provided. The powder product includes from about 80 wt. % to about 99.9 wt. % associative polymer; and from about 0.1 wt. % to about 20 wt. % of a cyclodextrin polymer.

13 Claims, 3 Drawing Sheets

(56) References Cited

U.S. PATENT DOCUMENTS

| | | | |
|---|---|---|---|
| 7,700,702 | B2 | 4/2010 | Gaillard et al. |
| 7,973,095 | B2 | 7/2011 | Herth et al. |
| 8,241,618 | B2 | 8/2012 | Brandt et al. |
| 8,425,726 | B2 | 4/2013 | Buwono et al. |
| 8,758,562 | B2 | 6/2014 | Krapsch et al. |
| RE45,383 | E | 2/2015 | St. John et al. |
| 9,279,217 | B2 | 3/2016 | Hietaniemi et al. |
| 9,567,708 | B2 | 2/2017 | Cheng et al. |
| 9,822,297 | B2 | 11/2017 | Brinkman |
| 2003/0022981 | A1 | 1/2003 | Baxter et al. |
| 2004/0110861 | A1 | 6/2004 | Shorbu et al. |
| 2005/0124704 | A1 | 6/2005 | Rasheed et al. |
| 2005/0161183 | A1 | 7/2005 | Covarrubias |
| 2005/0230319 | A1 | 10/2005 | Mori et al. |
| 2006/0065380 | A1 | 3/2006 | Garnier et al. |
| 2006/0142432 | A1 | 6/2006 | Harrington et al. |
| 2006/0270801 | A1 | 11/2006 | Hagiopol et al. |
| 2006/0276597 | A1 | 12/2006 | Quadir et al. |
| 2006/0289136 | A1 | 12/2006 | Doherty et al. |
| 2006/0289137 | A1 | 12/2006 | Gelman et al. |
| 2007/0155880 | A1* | 7/2007 | Bobsein .............. C08G 18/73 524/379 |
| 2008/0004405 | A1 | 1/2008 | Mori et al. |
| 2008/0058456 | A1 | 3/2008 | Chiou et al. |
| 2008/0216979 | A1 | 9/2008 | Schaffer |
| 2009/0074698 | A1 | 3/2009 | Biganska |
| 2009/0145566 | A1 | 6/2009 | Esser et al. |
| 2009/0165976 | A1 | 7/2009 | Soane et al. |
| 2009/0165978 | A1 | 7/2009 | Hagiopol et al. |
| 2010/0076145 | A1 | 3/2010 | Bobsein et al. |
| 2010/0190948 | A1 | 7/2010 | Proverb et al. |
| 2010/0286434 | A1 | 11/2010 | Bobsein et al. |
| 2010/0331510 | A1 | 12/2010 | Reichenbach-Klinke et al. |
| 2011/0056640 | A1 | 3/2011 | Cyr et al. |
| 2011/0155339 | A1 | 6/2011 | Brungardt et al. |
| 2011/0281980 | A1 | 11/2011 | Bobsein et al. |
| 2012/0129734 | A1 | 5/2012 | Reichenbach-Klinke et al. |
| 2012/0132382 | A1 | 5/2012 | Hund et al. |
| 2014/0360691 | A1 | 12/2014 | Hietaniemi et al. |
| 2015/0059998 | A1 | 3/2015 | Zhao et al. |
| 2015/0087796 | A1 | 3/2015 | Millard et al. |
| 2015/0167245 | A1 | 6/2015 | Cheng et al. |
| 2015/0197893 | A1 | 7/2015 | Cheng et al. |
| 2015/0367018 | A1 | 12/2015 | Oshima et al. |
| 2016/0097160 | A1 | 4/2016 | Castro et al. |
| 2016/0097161 | A1 | 4/2016 | Benz et al. |
| 2016/0244594 | A1 | 8/2016 | Langlotz |
| 2016/0311940 | A1 | 10/2016 | Hund et al. |
| 2016/0326698 | A1 | 11/2016 | Chen et al. |
| 2017/0029546 | A1 | 2/2017 | Langlotz |
| 2017/0037298 | A1 | 2/2017 | Li et al. |
| 2017/0037299 | A1 | 2/2017 | Li et al. |
| 2017/0037574 | A1 | 2/2017 | Grimm et al. |
| 2017/0037575 | A1 | 2/2017 | Hund et al. |

FOREIGN PATENT DOCUMENTS

| | | |
|---|---|---|
| CN | 102532409 | 7/2012 |
| CN | 102660150 | 9/2012 |
| CN | 104844760 A | 8/2015 |
| EP | 0374478 A2 | 6/1990 |
| EP | 0614950 A1 | 9/1994 |
| EP | 2933271 A1 | 10/2015 |
| FR | 2377447 A2 | 8/1978 |
| GB | 1372787 A | 11/1974 |
| JP | S5493089 A | 7/1979 |
| JP | 2002054088 A | 2/2002 |
| WO | 9835095 | 8/1998 |
| WO | 9034582 | 6/2000 |
| WO | 200049227 A1 | 8/2000 |
| WO | 2006071633 | 7/2006 |
| WO | 2012042157 | 4/2012 |
| WO | 2012100156 | 7/2012 |
| WO | 2013153004 | 10/2013 |
| WO | 2014076372 | 5/2014 |
| WO | 2015110703 | 7/2015 |
| WO | 2015158517 A1 | 10/2015 |
| WO | 2016120524 | 8/2016 |
| WO | 2016170230 | 10/2016 |
| WO | 2017106310 | 6/2017 |
| WO | 2017/182568 A1 | 10/2017 |

OTHER PUBLICATIONS

"Fixative Polymers and Hair Styling Compositions Thereof," IP.com Journal, 44 pages (May 20, 2015).

Lingström, Rikard et al., "Polyelectrolyte multilayers on wood fibers: Influence of molecular weight on layer properties and mechanical properties of papers from treated fibers," Journal of Colloid and Interface Science, vol. 328, pp. 233-242 (2008).

Ma, Yongsheng et al., "Study on Synthesis of Cationic Water in Water Polyacrylamide Emulsion Strength Agent," Advanced Materials Research, vols. 581-582, pp. 164-167 (Oct. 22, 2012).

Marimuthu, P. et al., "Anionic Acrylamide Co-Polymer as Dry Strength Additive for Paper," IPPTA Journal, vol. 22(3), pp. 131-135 (Jul.-Sep. 2010).

Mata, Jitendra et al., "Aggregation behavior of quaternary salt based cationic surfactants," Thermochimica Acta, vol. 428, pp. 147-155 (2005).

McLean, Douglas et al., "Synthesis of Guar Gum-Graft-Poly(Acrylamide-Co-Diallyldimethylammonium Chloride) and Its Application in the Pulp and Paper Industry," BioResources, vol. 6(4), pp. 4168-4180 (2011).

Nakamura, Tomonori, "PAM-type Ply Bond Strength agent "Himoloc MJ-450"," Japan Tappi Journal, vol. 57(11), pp. 1618-1621 (2003), English abstract only.

Nobukuni, Shigeki et al., "The Latest Technological Trends of PAM Based Dry Strength Resins," Kami-pa-gi-kyo-shi, vol. 70(5), pp. 493-197 (Aug. 2016).

Richardson, Des et al., "Optimisation of Neutral Papermaking Wet End Chemistry for Pitch Free Newsprint Manufacture," APPITA Annual General Conference, pp. 219-226 (2003); Conference: 57th Appita Annual General Conference and Exhibit, Melbourne, Australia, May 5-7, 2003.

Shen, Yi-ding et al. "Study on aqueous solution properties of hydrophobically associating cationic polyacrylamides and its application," Modern Chemical Industry, vol. 27(4), pp. 38-10 + 42 (Apr. 2007), English abstract only.

Suzuki, Hiroshi et al., "Novel PAM Based Dry Strength Resins," Kami-pa-gi-kyo-shi, vol. 66(5), pp. 477-480 (Jan. 2012), English abstract only.

Vanerek, Alois, "Filler Retention in Papermaking by Polymeric and Microparticulate Retention Aid Systems," ProQuest Dissertations and Theses Global, 2005, Paper No. NR12960; Publisher: ProQuest LLC, 130 pages.

Volet, Gisèle et al. "pH Sensitive supramolecular assembling system between a new linear water soluble β-cyclodextrin terpolymer and an amphiphilic poly(ethylene oxide)," European Polymer Journal, vol. 45(3), pp. 852-862 (2009).

Wang, Ying et al. "Cyclodextrins modify the properties of cationic polyacrylamides," Journal of Colloid and Interface Science, vol. 339(2), pp. 325-329 (2009).

Wenz, Gerhard et al. "Association Thickener by Host-Guest Interaction of β-Cyclodextrin Polymers and Guest Polymers," Associative Polymers in Aqueous Media, Chapter 16. Washington DC: American Chemical Society, vol. 765, pp. 271-283 (Aug. 10, 2000).

Wintgens, Véronique et al. "Aqueous Polysaccharide Associations Mediated by β-Cyclodextrin Polymers," Biomacromolecules, vol. 9(5), pp. 1434-1442 (2008).

Wintgens, Véronique et al. "Water-soluble γ-cyclodextrin polymers with high molecular weight and their complex forming properties," European Polymer Journal, vol. 46(9), pp. 1915-1922, (2010).

Wu, Weibing et al. "Preparation and Application of Hydrophobically Associating Cationic Polyacrylamide," Advanced Materials Research, vols. 284-286, pp. 1808-1814, (2011).

(56) References Cited

OTHER PUBLICATIONS

Zhang, Guang-hua et al., "Preparation of Polyacrylamide in Brine with Aqueous Two-Phase Copolymerization and Its Application as Paper Strength Agent," China Pulp & Paper, vol. 27(7), pp. 32-35 (2008), English abstract only.

Zhu, Xian-mei et al., "Preparation of Active Resistant-Electrolytic Amphoteric Polyacrylamide and Its Application as Paper Strength Aid," Journal of Xi'an University of Technology, vol. 26(4), pp. 412-416 (2010), English abstract only.

Zhu, Xian-mei et al., "Study of Branched Polyacrylamide Preparation and Application," Advanced Materials Research, vol. 174, pp. 490-493 (Dec. 2010), English abstract only.

Li, Shu-Jing et al. "Host-guest Interaction between Water-soluble β-Cyclodextrin Polymer and Hydrophobically Modified Polyacrylamide," Acta Chimica Sinica, Dec. 31, 2005, 63(19), pp. 1841-1846 (with English abstract).

Lu, Qiang, "Study on intermolecular interaction of cyclodextrin and hydrophobic associative polymer," Chinese Master's Thesis. Engineering Science and Technology, an International Journal, Aug. 15, 2015, 1(8), pp. B014-B238. English summary attached.

Gosselet, et al. "Association of hydrophobically modified poly (N,N-dimethylacrylamide hydroxyethylmethacrylate) with water soluble β-cyclodextrin polymers," Colloids and Surfaces A: Physicochemical and Engineering Aspects, 155(2-3) (1999) pp. 177-188.

\* cited by examiner

SOLUTION COMPRISING AN ASSOCIATIVE POLYMER AND A CYCLODEXTRIN POLYMER

BACKGROUND OF THE INVENTION

High molecular weight polymers (e.g., at least 2 million Daltons) are used in many industrial processes. For example, high molecular weight polymers are used in papermaking and water treatment applications as chemical aids to improve dewatering, drainage, and shear stability. Similarly, polymers with relatively low molecular weight (e.g., typically lower than 2 million Daltons) are used in many industrial processes. For example, low molecular weight polymers can be utilized in papermaking to help improve the strength of the sheet. Depending on polymer structure, weight average molecular weight, and function, the polymers may exist as powder, liquid, or concentrated solution.

Polymers may be cross-linked and/or branched. Due to their relative insolubility, cross-linked and branched polymer powders generally require large make down units to obtain a solution-based polymer capable of being applied to an industrial process. For example, when used for papermaking, high and low molecular weight polymer powders need to be made down at low concentration, under gentle mixing, for extended periods. Generally, the aforementioned process is cumbersome but ensures that the powder polymer is fully dissolved without degrading the molecular weight, which results in peak performance for the made-down polymer. A drawback to this approach is that the demand for low concentration solutions generally requires large make down equipment, and, thus, maintains a large spatial footprint. Moreover, low concentration polymer solutions such as these result in diminished complexity in polymer structure, and thereby, may fail to meet application needs.

One technique to facilitate the dissolution process and reduce the spatial footprint is to reduce particle size of the powder polymer. Although this technique shortens dissolution times, the reduced particle size tends to suffer from other drawbacks, such as cost, resources, and degradation associated with grinding, "fisheyes" (i.e., caking together of powder particles upon wetting), and safety and regulatory issues related to dusting, packaging, and storing the powder polymer.

Thus, there remains a need for methods of making down powder polymer products that do not require finely ground powder, low concentrations, and extended mixing times. Additionally, the resulting chemical compositions must maintain a complex polymer structure capable of meeting application needs.

BRIEF SUMMARY OF THE INVENTION

A solution comprising an associative polymer, a cyclodextrin polymer, and a solvent is provided. The associative polymer is a powder in the absence of the solvent.

Additionally, a method of making down an associative polymer powder to form a solution is provided. The method comprises blending a mixture of the associative polymer powder, a cyclodextrin polymer, and a solvent to yield the solution, wherein the powder comprises particles having been dry-cut to a median particle size of from about 200 microns to about 10,000 microns.

Additionally, a powder product is provided. The powder product comprises from about 90 wt. % to about 99.9 wt. % associative polymer powder; and from about 0.1 wt. % to about 10 wt. % of a cyclodextrin polymer.

The present disclosure provides a unique approach to making down an associative polymer powder. Using the solution described herein, the demands for low concentrations, small particle size, and extended mixing times can be mitigated. In addition, the solution provides improved dewatering and drainage of a chemical slurry.

DETAILED DESCRIPTION OF THE INVENTION

Figure 1:
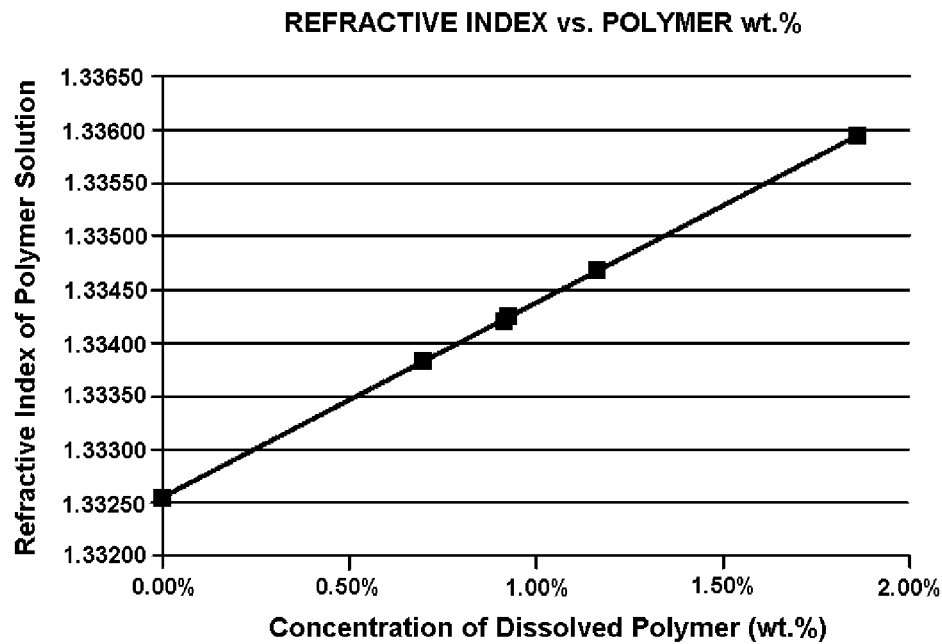
FIG. 1 graphically depicts a linear correlation of the refractive indices of associative polymer solutions in the absence of cyclodextrin polymer.

Generally, high and low molecular weight polymers are diluted, dissolved, and then added to their respective applications as aqueous solutions to avoid solubility issues and damage from the high heat and/or shear. Common approaches for ensuring complete dissolution of powder-based polymer products include, but are not limited to, reduced particle size, low powder concentrations, and extended mixing times. A benefit of the solutions and methods described herein, is that the process does not require a powder with reduced particle size, dilute mixing concentrations, or extended mixing times, and does not negatively affect the associative polymer, described herein. More particularly, the method provides improved dissolution of the associative polymer powder, and the resulting solution is less viscous and can improve dewatering and drainage in industrial applications. Thus, the methods, described herein, can help reduce costs associated with large make down equipment, and time consumed during make down and application to industrial processes.

A solution comprising an associative polymer, a cyclodextrin polymer, and a solvent is provided. The associative polymer is a powder in the absence of the solvent.

The solution comprises an associative polymer. As used herein, the terms "an associative polymer" or "the associative polymer" can refer to one or more associative polymer(s). For example, the solution can comprise a plurality (e.g., at least two polymer molecules) of associative polymer(s), wherein the associative polymer(s) have the same molecular structure (i.e., one associative polymer), or the associative polymer powder can comprise a plurality of associative polymer(s), wherein the associative polymer(s) have varying molecular structures (i.e., more than one associative polymer(s)). The one or more associative polymer(s) can be any suitable polymer. For example, the one or more associative polymer(s) can be homopolymers, copolymers, terpolymers, or greater, or a combination thereof. In certain embodiments, the one or more associative polymer(s) are terpolymers.

The solution can have any suitable associative polymer content. The solution can have an associative polymer content of about 10 wt. % or less, for example, about 9 wt. % or less, about 8 wt. % or less, about 7 wt. % or less, about 6 wt. % or less, about 5 wt. % or less, about 4 wt. % or less, or about 3 wt. % or less. Alternatively, or in addition to, the solution can have an associative polymer content of about 0.1 wt. % or more, for example, about 0.5 wt. % or more, about 1 wt. % or more, about 2 wt. % or more, or about 3 wt. % or more. Thus, the solution can have an associative polymer content bounded by any two of the aforementioned endpoints. The solution can have an associative polymer content from about 0.1 wt. % to about 10 wt. %, for example, from about 0.5 wt. % to about 10 wt. %, from about 1 wt. % to about 10 wt. %, from about 2 wt. % to about 10 wt. %, from about 3 wt. % to about 10 wt. %, from about 0.1 wt. % to about 9 wt. %, from about 0.1 wt. % to about 8 wt. %, from about 0.1 wt. % to about 7 wt. %, from about 0.1 wt. % to about 6 wt. %, from about 0.1 wt. % to about 5 wt. %, from about 0.1 wt. % to about 4 wt. %, from about 0.1 wt. % to about 3 wt. %, from about 0.5 wt. % to about 5 wt. %, from about 0.5 wt. % to about 3 wt. %, from about 1 wt. % to about 5 wt. %, or from about 1 wt. % to about 4 wt. %.

The associative polymer can be cationic, anionic, amphoteric, non-ionic, or zwitterionic. In some embodiments, the associative polymer is cationic. As used herein, "cationic" polymers refer to polymers containing cationic monomer units or a combination of cationic monomer units and non-ionic monomer units. In some embodiments, the associative polymer is anionic. As used herein, "anionic" polymers refer to polymers containing anionic monomer units or a combination of anionic monomer units and non-ionic monomer units. In some embodiments, the associative polymer is amphoteric. As used herein, "amphoteric" polymers refer to polymers containing cationic monomer units and anionic monomer units, or cationic monomer units, anionic monomer units, and non-ionic monomer units. In some embodiments, the associative polymer is non-ionic. As used herein, "non-ionic" polymers refer to polymers containing non-ionic monomer units. In some embodiments, the associative polymer is zwitterionic. As used herein, "zwitterionic" polymers refer to polymers containing zwitterionic monomer units or a combination of zwitterionic monomer units and cationic monomer units, anionic monomer units, and/or non-ionic monomer units.

The associative polymer can exist as any suitable structure type. For example, the associative polymer can exist as an alternating polymer, random polymer, block polymer, graft polymer, linear polymer, branched polymer, cyclic polymer, or a combination thereof.

The associative polymer can contain a single monomer unit, or any suitable number of different monomer units. For example, the associative polymer can contain 2 different monomer units, 3 different monomer units, 4 different monomer units, 5 different monomer units, or 6 different monomer units. The associative polymer's monomer units can exist in any suitable concentration and any suitable proportion.

In some embodiments, the solution comprises an associative polymer, wherein the associative polymer (i.e., absent of networking) has a weight average molecular weight of from about 10 kDa to about 20,000 kDa. The associative polymer can have a weight average molecular weight of about 20,000 kDa or less, for example, about 18,000 kDa or less, about 17,000 kDa or less, 15,000 kDa or less, about 10,000 kDa or less, about 8,000 kDa or less, about 6,000 kDa or less, about 5,000 kDa or less, about 4,000 kDa or less, about 3,000 kDa or less, about 2,500 kDa or less, about 2,000 kDa or less, about 1,800 kDa or less, about 1,600 kDa or less, about 1,400 kDa or less, about 1,200 kDa or less, about 1,000 kDa or less, about 900 kDa or less, about 800 kDa, or less, about 700 kDa or less, about 600 kDa or less, or about 500 kDa or less. Alternatively, or in addition, the associative polymer can have a weight average molecular weight of about 10 kDa or more, for example, about 50 kDa or more, about 100 kDa or more, about 200 kDa or more, about 300 kDa or more, or about 400 kDa or more. Thus, the associative polymer can have a weight average molecular weight bounded by any two of the aforementioned endpoints. For example, the associative polymer can have a weight average molecular weight of from about 10 kDa to about 20,000 kDa, from about 50 kDa to about 20,000 kDa, from about 100 kDa to about 20,000 kDa, from about 200 kDa to about 20,000 kDa, from about 300 kDa to about 20,000 kDa, from about 400 kDa to about 20,000 kDa, from about 10 kDa to about 18,000 kDa, from about 10 kDa to about 17,000 kDa, from about 10 kDa to about 15,000 kDa, from about 10 kDa to about 10,000 kDa, from about 10 kDa to about 8,000 kDa, from about 10 kDa to about 6,000 kDa, from about 400 kDa to about 600 kDa, from about 400 kDa to about 700 kDa, from about 400 kDa about 800 kDa, from about 400 kDa to about 900 kDa, from about 400 kDa to about 1,000 kDa, from about 400 kDa to about 1,200 kDa, from about 400 kDa to about 1,400 kDa, from about 400 kDa to about 1,600 kDa, from about 400 kDa to about 1,800 kDa, from about 400 kDa to about 2,000 kDa, from about 400 kDa to about 4,000 kDa, from about 400 kDa to about 8,000 kDa, from about 400 kDa to about 10,000 kDa, from about 400 kDa to about 15,000 kDa, from about 400 kDa to about 20,000 kDa, from about 10 kDa to about 2,000 kDa, from about 200 kDa to about 2,000 kDa, from about 500 kDa to about 2,000 kDa, from about 800 kDa to about 2,000 kDa, from about 200 kDa to about 2,500 kDa, from about 200 kDa to about 5,000 kDa, from about 200 kDa to about 10,000 kDa, from about 200 kDa to about 15,000 kDa, from about 200 kDa to about 20,000 kDa, from about 500 kDa to about 2,500 kDa, from about 800 kDa to about 2,500 kDa, from about 200 kDa to about 3,000 kDa, from about 500 kDa to about 3,000 kDa, from about 800 kDa to about 3,000 kDa, from about 200 kDa to about 4,000 kDa, from about 500 kDa to about 4,000 kDa, from about 800 kDa to about 4,000 kDa, from about 10 kDa to about 5,000 kDa, from about 200 kDa to about 5,000 kDa, from about 500 kDa to about 5,000 kDa, or from about 800 kDa to about 5,000 kDa.

Weight average molecular weight can be determined by any suitable technique. While alternate techniques are envisioned, in some embodiments, the weight average molecular weight is determined using size exclusion chromatography (SEC) equipped with a set of TSKgel PW columns (TSKgel Guard+GMPW+GMPW+G1000PW), Tosoh Bioscience LLC, Cincinnati, Ohio) and a Waters 2414 (Waters Corporation, Milford, Mass.) refractive index detector or a DAWN HELEOS II multi-angle light scattering (MALS) detector (Wyatt Technology, Santa Barbara, Calif.). Moreover, the weight average molecular weight is determined from either calibration with polyethylene oxide/polyethylene glycol standards ranging from 150-875,000 Daltons or directly using light scattering data with known refractive index increment ("dn/dc").

In certain embodiments, the weight average molecular weight is determined by hydrolysis of the associative polymer to remove the hydrolysable side chains and then further analyzed with size exclusion chromatography (SEC). The associative polymer can be hydrolyzed by any suitable technique. For example, the associative polymer can be hydrolyzed by treatment with a 0.1 wt. % solution of sodium hydroxide at pH 12 with a cage stirrer at 400 rpm for one hour. As used herein, "hydrolyzable side chains" refer to any side chain on an associative monomer unit or an additional monomer unit that can be cleaved through hydrolysis. Without wishing to be bound to any particular theory, the associative polymer, comprising an associative monomer unit, may need to be hydrolyzed prior to size exclusion chromatography due to low recovery rate from the column. Generally, hydrolysis of the associative polymer does not cleave the polymer backbone and preserves the degree of polymerization of the associative polymer.

In certain embodiments, the associative monomer unit does not contain a hydrolysable side chain. In embodiments where the associative monomer unit does not contain a hydrolysable side chain, the weight average molecular weight can be determined by analyzing a surrogate of the associative polymer. For example, the weight average molecular weight can be determined by synthesizing a polymer using the same formulation in the absence of the associative monomer unit. Without wishing to be bound to any particular theory, the polymer synthesized with the same formulation maintains a similar degree of polymerization and results in a weight average molecular weight similar to an associative polymer wherein the associative monomer unit is present.

Illustrative embodiments of the associative polymer generally include one or more associative monomer unit(s) and one or more additional monomer unit(s). As used herein, "additional monomer unit" refers to any monomer unit other than the associative monomer unit. In certain embodiments, the one or more additional monomer units are derived from a water-soluble monomer (e.g., acrylamide, diallyldimethylammonium chloride ("DADMAC"), 2-(acryloyloxy)-N,N,N-trimethylethanaminium chloride ("DMAEA.MCQ"), etc.). As used herein, "derived" when referring to a monomer unit, means that the monomer unit has substantially the same structure of a monomer from which it was made, wherein the terminal olefin has been transformed during the process of polymerization. In some embodiments, the associative polymer includes one or more associative monomer unit(s), a monomer unit derived from a monomer of Formula I, and one or more additional monomer unit(s). In certain embodiments, the associative polymer(s) include an associative monomer unit, a monomer unit derived from a monomer of Formula I, and an additional monomer unit.

In some embodiments, the one or more associative monomer unit(s), and the one or more additional monomer unit(s) can be incorporated into the associative polymer(s) using monomers, dimers, trimers, oligomers, adducts, or a combination thereof of the monomers structures from which they are derived. For example, the one or more associative monomer unit(s), or the one or more additional monomer unit(s) can exist as a dimer, trimer, oligomer, or adduct prior to incorporation into the associative polymer.

The associative polymer can comprise any one or more suitable additional monomer unit(s) selected from a cationic monomer unit, an anionic monomer unit, a nonionic monomer unit, a zwitterionic monomer unit, and a combination of two or more thereof. For example, the associative polymer can comprise a cationic monomer unit and an anionic monomer unit, an anionic monomer unit and a nonionic monomer unit, a cationic monomer unit and a nonionic monomer unit, or a cationic monomer unit, an anionic monomer unit, and a nonionic monomer unit. In certain embodiments, the associative polymer can comprise and/or further comprise a zwitterionic monomer unit. The associative polymer can be synthesized by any suitable polymerization method. For example, the associative polymer can be made through free radical polymerization, addition polymerization, free radical addition polymerization, cationic addition polymerization, anionic addition polymerization, emulsion polymerization, solution polymerization, suspension polymerization, precipitation polymerization, or a combination thereof. In certain embodiments, polymerization occurs through free radical polymerization.

Thus, a suitable additional monomer unit can be derived from any one or more suitable monomers capable of participating in free radical polymerization. For example, the associative polymer can comprise one or more additional monomer units derived from a monomer selected from a monomer of Formula I, 2-(dimethylamino)ethyl acrylate ("DMAEA"), 2-(dimethylamino)ethyl methacrylate ("DMAEM"), 3-(dimethylamino)propyl methacrylamide ("DMAPMA"), 3-(dimethylamino)propyl acrylamide ("DMAPA"), 3-methacrylamidopropyl-trimethyl-ammonium chloride ("MAPTAC"), 3-acrylamidopropyl-trimethyl-ammonium chloride ("APTAC"), N-vinyl pyrrolidone ("NVP"), N-vinyl acetamide, hydroxyethyl methacrylate, hydroxyethyl acrylate, diallyldimethylammonium chloride ("DADMAC"), diallylamine, vinylformamide, 2-(acryloyloxy)-N,N,N-trimethylethanaminium chloride ("DMAEA.MCQ"), 2-(methacryloyloxy)-N,N,N-trimethylethanaminium chloride ("DMAEM.MCQ"), N,N-dimethylaminoethyl acrylate benzyl chloride ("DMAEA.BCQ"), N,N-dimethylaminoethyl methacrylate benzyl chloride ("DMAEM.BCQ"), 2-acrylamido-2-methylpropane sulfonic acid ("AMPS"), 2-acrylamido-2-methylbutane sulfonic acid ("AMBS"), [2-methyl-2-[(1-oxo-2-propenyl)amino]propyl]-phosphonic acid, methacrylic acid, acrylic acid, salts thereof, and combinations thereof.

In some embodiments, the associative polymer(s) comprise a monomer unit derived from a monomer of Formula I:

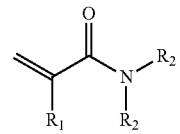

wherein $R_1$ is H or $C_1$-$C_4$ alkyl (e.g., methyl, ethyl, n-propyl, iso-propyl, n-butyl, sec-butyl, or tert-butyl) and each $R_2$ is independently H or an organic group. As used herein, the term "organic group" refers to an alkyl group, an aryl group, a fluoroalkyl group, or a fluoroaryl group. In certain embodiments, the monomer unit derived from a monomer of Formula I is considered an additional monomer unit.

In certain embodiments of the substituent $R_2$, the organic group is a $C_1$-$C_6$ alkyl group (i.e., 1, 2, 3, 4, 5, or 6 carbon units in length). In some embodiments, the $C_1$-$C_6$ alkyl group is saturated, unsaturated, branched, straight-chained, cyclic, or a combination thereof. An exemplary list of $C_1$-$C_6$ alkyl groups is methyl, ethyl, n-propyl, iso-propyl, n-butyl, sec-butyl, tert-butyl, n-pentyl, sec-pentyl, neo-pentyl, or hexyl. In certain embodiments, the $C_1$-$C_6$ alkyl group is substituted with one or more alkyl substituents, aryl substituents, heteroatoms, or combinations thereof (e.g., benzyl, phenylethyl, phenylpropyl, etc.). In some embodiments, the $C_1$-$C_6$ alkyl group can be a $C_1$-$C_6$ heteroalkyl group (i.e., 1, 2, 3, 4, 5, or 6 carbon units in length). As used herein, "heteroalkyl group" refers to a saturated or unsaturated, substituted or unsubstituted, straight-chained, branched, or cyclic aliphatic group that contains at least 1 heteroatom (e.g., O, S, N, and/or P) in the core of the molecule (i.e., the carbon backbone).

In certain embodiments of the substituent $R_2$, the organic group is an aryl group. The aryl group can be any substituted or unsubstituted aryl or heteroaryl group, wherein the heteroaryl group is an aromatic 5- or 6-membered monocyclic group that has at least one heteroatom (e.g., O, S, or N) in at least one of the rings. The heteroaryl group can contain one or two oxygen or sulfur atoms and/or from one to four nitrogen atoms, provided that the total number of heteroatoms in the ring is four or less and the ring has at least one carbon atom. Optionally, the nitrogen, oxygen, and sulfur atoms can be oxidized (i.e., has undergone a process of losing electrons), and the nitrogen atoms optionally can be quaternized. In some embodiments, the aryl compound is phenyl, pyrrolyl, furanyl, thiophenyl, pyridyl, isoxazolyl, oxazolyl, isothiazolyl, thiazolyl, imidazolyl, thiadiazolyl, tetrazolyl, triazolyl, oxadiazolyl, pyrazolyl, pyrazinyl, triazinyl, pyrimidinyl, or pyridazinyl.

In certain embodiments of the substituent $R_2$, the organic group is a $C_1$-$C_6$ fluoroalkyl group or a $C_1$-$C_6$ fluoroaryl group. As used herein, the terms "fluoroalkyl" and "fluoroaryl" refer to any alkyl group or aryl group, respectively, with one or more fluorine atoms.

In certain embodiments, the monomer of Formula I is acrylamide or methacrylamide.

The associative polymer can comprise the one or more additional monomer unit(s) in any suitable concentration, so long as the associative polymer includes a suitable portion of one or more associative monomer unit(s) as provided herein. The associative polymer can comprise a sum total of about 90 mol % or more of the one or more additional monomer unit(s), for example, about 91 mol % or more, about 92 mol % or more, about 93 mol % or more, about 94 mol % or more, about 95 mol % or more, about 96 mol % or more, about 97 mol % or more, about 98 mol % or more, or about 99 mol % or more. Alternatively, or in addition to, the associative polymer can comprise a sum total of about 99.995 mol % or less of the one or more additional monomer unit(s), for example, about 99.99 mol % or less, about 99.9 mol % or less, about 99.75 mol % or less, about 99.5 mol % or less, about 99.4 mol % or less, about 99.3 mol % or less, about 99.2 mol % or less, or about 99.1 mol % or less. Thus, the associative polymer can comprise the one or more additional monomer unit(s) in a sum total concentration bounded by any two of the aforementioned endpoints. The associative polymer can comprise a sum total from about 90 mol % to about 99.995 mol % of the one or more additional monomer unit(s), for example, from about 91 mol % to about 99.995 mol %, from about 92 mol % to about 99.995 mol %, from about 93 mol % to about 99.995 mol %, from about 94 mol % to about 99.995 mol %, from about 95 mol % to about 99.995 mol %, from about 97 mol % to about 99.995 mol %, from about 98 mol % to about 99.995 mol %, from about 99 mol % to about 99.995 mol %, from about 99 mol % to about 99.99 mol %, from about 99 mol % to about 99.9 mol %, from about 99 mol % to about 99.75 mol %, from about 99 mol % to about 99.5 mol %, from about 99 mol % to about 99.4 mol %, from about 99 mol % to about 99.3 mol %, from about 99 mol % to about 99.2 mol %, from about 99 mol % to about 99.1 mol %, from about 99.5 mol % to about 99.99 mol %, from about 99.5 mol % to about 99.995 mol %, from about 99.75 mol % to about 99.99 mol %, or from about 99.75 mol % to about 99.995 mol %.

The associative polymer can comprise one or more associative monomer unit(s) of any suitable type(s). As described herein, "associative monomer unit" refers to any monomer unit capable of coordinating with itself, other associative monomer units, or a combination thereof. The coordination can occur through any suitable interaction. For example, the coordination can occur through ionic bonding, hydrogen bonding, hydrophobic interactions, dipolar interactions, Van der Waals forces, or a combination of two or more such coordination types.

In some embodiments, the associative monomer unit is formed post polymerization by attaching an associative moiety to a polymer. As used herein, "associative moiety" refers to any pendant chemical structure capable of coordinating with itself, other associative monomer units, or a combination thereof. The coordination can occur through any suitable interaction. For example, the coordination can occur through ionic bonding, hydrogen bonding, hydrophobic interactions, dipolar interactions, Van der Waals forces, or a combination of two or more such coordination types. In some embodiments, the associative moiety is attached directly to the terminal end of a polymer, attached through a linker to the terminal end of a polymer, attached directly to the polymer backbone, attached to the polymer backbone through a linker, or a combination thereof.

In certain embodiments, the one or more associative monomer unit(s) of the one or more associative polymer are structurally similar. As used herein, "structurally similar" means that the associative monomer unit(s) have similar chemical functional groups. In some embodiments, the associative monomer unit(s) each comprise at least one hydroxyl substituent. In some embodiments, the associative monomer unit(s) each comprise at least one amine substituent. In some embodiments, the associative monomer unit(s) each comprise a polyether chain. In some embodiments, the associative monomer unit(s) each comprise a polyether chain, wherein the length of the polyether chains are separated by six carbon units or less (i.e., 6, 5, 4, 3, 2, 1, or 0). For example, if an associative monomer unit has a polyether chain length of 16 carbon units, then a structurally similar associative monomer unit will have a polyether chain length from 10-22 carbon units (i.e., 10, 11, 12, 13, 14, 15, 16, 17, 18, 19, 20, 21, or 22). In certain embodiments, the polyether chains each comprise the same number of carbon units. In some embodiments, the associative monomer unit(s) each comprise an alkyl chain. In some embodiments, the associative monomer unit(s) each comprise alkyl chains, wherein the length of the alkyl chains are separated by six carbon units or less (i.e., 6, 5, 4, 3, 2, 1, or 0). For example, if an associative monomer unit has an alkyl chain length of 16 carbon units, then a structurally similar associative monomer unit will have an alkyl chain length from 10-22 carbon units (i.e., 10, 11, 12, 13, 14, 15, 16, 17, 18, 19, 20, 21, or 22). In certain embodiments, the alkyl chains each comprise the same number of carbon units. In certain embodiments, the associative monomer unit(s) are the same.

In certain embodiments, the one or more associative monomer unit(s) are incorporated into the polymer through polymerization with one or more associative monomer(s). Thus, the one or more associative monomer unit(s) can be derived from any one or more suitable associative monomer(s) selected from a nonionic associative monomer, a cationic associative monomer, an anionic associative monomer, a zwitterionic associative monomer, and a combination thereof. The one or more associative monomer(s) are capable of participating in polymerization. In certain embodiments, the one or more associative monomer(s) comprise an unsaturated subunit (e.g., acrylate, acrylamide, etc.), separate from the associative moiety, capable of participating in free radical polymerization. Generally, the one or more associative monomer(s) are selected from an acrylate, an acrylamide, or a combination thereof.

In an embodiment, the associative monomer unit is a nonionic associative monomer unit. Generally, the nonionic associative monomer unit is derived from an acrylate and/or an acrylamide monomer of Formula II:

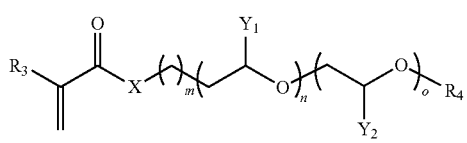

wherein $R_3$ is H or $C_1$-$C_{10}$ alkyl (e.g., (CH$_2$CH$_3$)), wherein k is an integer from 0 to 9 (i.e., 0, 1, 2, 3, 4, 5, 6, 7, 8, or 9), X is O or NH, m, n, and o are independently integers from 0 to 100, wherein when (n+o)≤3, m is at least 7, each $Y_1$ and $Y_2$ are independently H or $C_1$-$C_4$ alkyl (e.g., methyl, ethyl, n-propyl, iso-propyl, n-butyl, sec-butyl, or tert-butyl), and $R_4$ is H or a hydrophobic group. In some embodiments, "$C_1$-$C_{10}$ alkyl" refers to a branched $C_1$-$C_{10}$ to alkyl group. In certain embodiments, each $Y_1$ and $Y_2$ is independently chosen to produce block or random copolymers of ethylene oxide ("EO"), propylene oxide ("PO"), or a combination thereof. In some embodiments, m, n, and o refer to an average (rounded to the nearest integer) chain length of the designated subunits (i.e., average carbon chain length or average EO/PO chain length). As used herein, the term "hydrophobic group" refers to an alkyl group, an aryl group, a fluoroalkyl group, or a fluoroaryl group.

In certain embodiments of the substituent $R_4$, the hydrophobic group is a $C_1$-$C_{32}$ alkyl group (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, or 32 carbon units in length). In some embodiments, the $C_1$-$C_{32}$ alkyl group is saturated, unsaturated, branched, straight-chained, cyclic, or a combination thereof. An exemplary list of $C_1$-$C_{32}$ alkyl groups is methyl, ethyl, n-propyl, iso-propyl, n-butyl, sec-butyl, tert-butyl, n-pentyl, sec-pentyl, neo-pentyl, hexyl, heptyl, octyl, nonyl, lauryl, stearyl, cetyl, behenyl, cyclopentyl, cyclohexyl, propenyl, 2-butenyl, 3-butenyl, 2-pentenyl, 3-pentenyl, or 4-pentenyl. In certain embodiments, the $C_1$-$C_{32}$ alkyl carbon group is further substituted with one or more alkyl substituents, aryl substituents, heteroatoms, or combinations thereof. In some embodiments, the $C_1$-$C_{32}$ alkyl group can be a $C_1$-$C_{32}$ heteroalkyl group (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, or 32 carbon units in length). As used herein, "heteroalkyl group" refers to a saturated or unsaturated, substituted or unsubstituted, straight-chained, branched, or cyclic aliphatic group that contains at least 1 heteroatom (e.g., O, S, N, and/or P) in the core of the molecule (i.e., the carbon backbone).

As used herein, the term "substituted" means that one or more hydrogens on the designated atom or group are replaced with another group provided that the designated atom's normal valence is not exceeded. For example, when the substituent is oxo (i.e., =O), then two hydrogens on the carbon atom are replaced. Combinations of substituents are permissible provided that the substitutions do not significantly adversely affect synthesis or use of the associative polymer.

In certain embodiments of the substituent $R_4$, the hydrophobic group is an aryl group. The aryl group can be any substituted or unsubstituted aryl or heteroaryl group, wherein the heteroaryl group is an aromatic 5- or 6-membered monocyclic group, 9- or 10-membered bicyclic group, or an 11- to 14-membered tricyclic group, which has at least one heteroatom (e.g., O, S, or N) in at least one of the rings. Each ring of the heteroaryl group containing a heteroatom can contain one or two oxygen or sulfur atoms and/or from one to four nitrogen atoms, provided that the total number of heteroatoms in each ring is four or less and each ring has at least one carbon atom. The fused rings completing the bicyclic and tricyclic groups may contain only carbon atoms and may be saturated, partially saturated, or unsaturated. The nitrogen, oxygen, and sulfur atoms optionally can be oxidized, and the nitrogen atoms optionally can be quaternized. Heteroaryl groups that are bicyclic or tricyclic must include at least one fully aromatic ring, but the other fused ring or rings can be aromatic or non-aromatic. In some embodiments, the aryl group is phenyl, naphthyl, pyrrolyl, isoindolyl, indolizinyl, indolyl, furanyl, benzofuranyl, benzothiophenyl, thiophenyl, pyridyl, acridinyl, naphthyridinyl, quinolinyl, isoquinolinyl, isoxazolyl, oxazolyl, benzoxazolyl, isothiazolyl, thiazolyl, benzthiazolyl, imidazolyl, thiadiazolyl, tetrazolyl, triazolyl, oxadiazolyl, benzimidazolyl, purinyl, pyrazolyl, pyrazinyl, pteridinyl, quinoxalinyl, phthalazinyl, quinazolinyl, triazinyl, phenazinyl, cinnolinyl, pyrimidinyl, or pyridazinyl.

In certain embodiments of the substituent $R_4$, the hydrophobic group is a $C_1$-$C_{32}$ fluoroalkyl group or a $C_1$-$C_{32}$ fluoroaryl group. As used herein, the terms "fluoroalkyl" and "fluoroaryl" refer to any alkyl group or aryl group, respectively, with one or more fluorine atoms.

In certain embodiments, the nonionic associative monomer unit is derived from an acrylate monomer comprising an acrylate head group of Formula III:

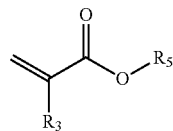

wherein $R_5$ is —CH$_2$(CH$_2$)$_p$CH$_3$, $R_3$ is H or $C_1$-$C_{10}$ to alkyl (e.g., (CH$_2$)$_k$CH$_3$), wherein k is an integer from 0 to 9 (i.e., 0, 1, 2, 3, 4, 5, 6, 7, 8, or 9)), and p is an integer from 3 to 100 (e.g., from 4 to 50, from 6 to 50, from 8 to 50, from 10 to 50, from 12 to 50, from 16 to 50, or from 18 to 50. In some embodiments, the acrylate monomer of Formula III is a mixture of two or more such acrylates, such that the average (rounded to the nearest integer) value of p is an integer from 3 to 100 (e.g., from 4 to 50, from 6 to 50, from 8 to 50, from 10 to 50, from 12 to 50, from 16 to 50, or from 18 to 50). In some embodiments, "$C_1$-$C_{10}$ alkyl" refers to a branched $C_1$-$C_{10}$ alkyl group. In certain embodiments, $R_5$ is a branched alkyl group from 3 to 100 carbon units in length. Generally, the nonionic associative monomer is selected from laurylacrylate, cetylacrylate, stearylacrylate, behenylacrylate, or a combination thereof. In certain embodiments, the nonionic associative monomer unit is laurylacrylate, i.e., $R_3$=H and p=10.

In certain embodiments, the nonionic associative monomer unit is derived from an acrylate monomer comprising an acrylate head group of Formula IV:

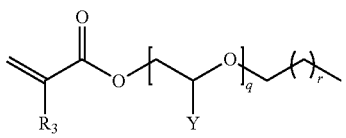

wherein $R_3$ is H or $C_1$-$C_{10}$ alkyl (e.g., $(CH_2CH_3)$, wherein k is an integer from 0 to 9 (i.e., 0, 1, 2, 3, 4, 5, 6, 7, 8, or 9), q is an integer from 2 to 100 (e.g., from 4 to 50, from 6 to 50, from 8 to 50, from 10 to 50, from 12 to 50, from 16 to 50, from 18 to 50, from 16 to 100, from 18 to 100, or from 50 to 100), r is an integer from 0 to 30 (e.g., from 2 to 30, from 4 to 30, from 6 to 30, from 8 to 30, from 10 to 30, from 12 to 30, from 16 to 30, from 18 to 30, from 20 to 30, from 22 to 30, or from 24 to 30), and each Y is independently H or $CH_3$. In some embodiments, "$C_1$-$C_{10}$ alkyl" refers to a branched $C_1$-$C_{10}$ alkyl group. In certain embodiments, each Y is independently selected to produce block or random copolymers of ethylene oxide ("EO"), propylene oxide ("PO"), or a combination thereof. In some embodiments, the acrylate monomer of Formula N is a mixture of two or more such acrylates, such that the average (rounded to the nearest integer) value of q is an integer from 2 to 100, (e.g., from 4 to 50, from 6 to 50, from 8 to 50, from 10 to 50, from 12 to 50, from 16 to 50, from 18 to 50, from 16 to 100, from 18 to 100, or from 50 to 100), and the average (rounded to the nearest integer) value of r is an integer from 0 to 30 (e.g., from 2 to 30, from 4 to 30, from 6 to 30, from 8 to 30, from 10 to 30, from 12 to 30, from 16 to 30, from 18 to 30, from 20 to 30, from 22 to 30, or from 24 to 30). In some embodiments, the acrylate monomer of Formula N is lauryl polyethoxy (25) methacrylate, cetyl polyethoxy (25) methacrylate, stearyl polyethoxy (25) methacrylate, behenyl polyethoxy (25) methacrylate, or a combination thereof. In certain embodiments, the nonionic associative monomer unit is a VISIOMER® ether methacrylate commercially available from Evonik Industries (Essen, Germany). In some embodiments, the nonionic associative monomer unit is cetyl and/or stearyl polyethoxy (25) methacrylic ester, marketed under the product name methacrylic ester (25 EO) $C_{16}$-$C_{18}$ fatty alcohol ("C18PEG1105MA"), commercially available from Evonik Industries (Essen, Germany).

In certain embodiments, the nonionic associative monomer unit is derived from an acrylate monomer comprising an acrylate head group of Formula V:

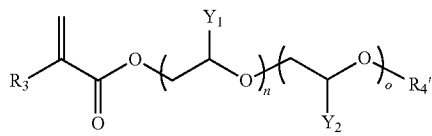

wherein $R_3$ is H or $C_1$-$C_{10}$ alkyl (e.g., $(CH_2CH_3)$, wherein k is an integer from 0 to 9 (i.e., 0, 1, 2, 3, 4, 5, 6, 7, 8, or 9), each $Y_1$ and $Y_2$ are independently H or $C_1$-$C_4$ alkyl (e.g., methyl, ethyl, n-propyl, iso-propyl, n-butyl, sec-butyl, or tert-butyl), and n and o are independently integers ranging from 0 to about 100 (e.g., from about 0 to about 90, from about 0 to about 80, from about 0 to about 70, from about 0 to about 60, from about 0 to about 50, from about 10 to about 100, or from about 10 to about 50), $R_4'$ is $C_5$-$C_{30}$ alkyl group (i.e., 8, 9, 10, 11, 12, 13, 14, 15, 16, 17, 18, 19, 20, 21, 22, 23, 24, 25, 26, 27, 28, 29, or 30 carbon units in length), wherein n and o cannot both be 0. In some embodiments, "$C_1$-$C_{10}$ alkyl" refers to a branched $C_1$-$C_{10}$ alkyl group. In certain embodiments, each $Y_1$ and $Y_2$ are independently selected to produce block or random copolymers of ethylene oxide ("EO"), propylene oxide ("PO"), or a combination thereof. In some embodiments, the acrylate monomer of Formula V is a mixture of two or more such acrylates, such that the average (rounded to the nearest integer) values of n and o are independently integers from 0 to 100, (e.g., from 0 to 50, from 6 to 50, from 8 to 50, from 10 to 50, from 12 to 50, from 16 to 50, from 18 to 50, from 16 to 100, from 18 to 100, or from 50 to 100). In certain embodiments, the acrylate monomer of Formula V contains a side chain derived from a Plurafac® surfactant, commercially available from BASF Corporation (Florham Park, N.J.).

In another embodiment, the associative monomer unit is a cationic associative monomer unit. Generally, the cationic associative monomer unit is derived from an acrylate salt monomer and/or an acrylamide salt monomer of Formula VI:

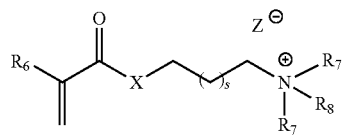

wherein $R_6$ and $R_7$ are each independently H or $C_1$-$C_{10}$ alkyl (e.g., $(CH_2)(CH_3)$ wherein t is an integer from 0 to 9 (i.e., 0, 1, 2, 3, 4, 5, 6, 7, 8, or 9), X is O or NH, s is an integer from 0 to 20 (e.g., from 2 to 20, from 4 to 20, from 6 to 20, from 8 to 20, from 5 to 10, from 10 to 20, from 5 to 15, from 12 to 20, from 0 to 10, from 0 to 8, from 0 to 6, or from 0 to 4), Z is any anion, and $R_8$ is a hydrophobic group. In some embodiments, the acrylate and/or acrylamide salt of Formula VI is a mixture of two or more such acrylates and/or acrylamides, such that the average (rounded to the nearest integer) value of s is an integer from 0 to 20 (e.g., from 2 to 20, from 4 to 20, from 6 to 20, from 8 to 20, from 5 to 10, from 10 to 20, from 5 to 15, from 12 to 20, from 0 to 10, from 0 to 8, from 0 to 6, or from 0 to 4). In some embodiments, "$C_1$-$C_{10}$ to alkyl" refers to a branched $C_1$-$C_{10}$ to alkyl group. As used herein, the term "hydrophobic group" refers to an alkyl group, an aryl group, a fluoroalkyl group, or a fluoroaryl group.

In certain embodiments of the substituent Its, the hydrophobic group is a $C_1$-$C_{32}$ alkyl group (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, or 32 carbon units in length). In some embodiments, the $C_1$-$C_{32}$ alkyl group is saturated, unsaturated, branched, straight-chained, cyclic, or a combination thereof. An exemplary list of $C_1$-$C_{32}$ alkyl groups is methyl, ethyl, n-propyl, iso-propyl, n-butyl, sec-butyl, tert-butyl, n-pentyl, sec-pentyl, neo-pentyl, hexyl, heptyl, octyl, nonyl, lauryl, stearyl, cetyl, behenyl, cyclopentyl, cyclohexyl, propenyl, 2-butenyl, 3-butenyl, 2-pentenyl, 3-pentenyl, or 4-pentenyl. In certain embodiments, the $C_1$-$C_{32}$ alkyl group is further substituted with one or more alkyl substituents, aryl substituents, heteroatoms, or combinations thereof. In some embodiments, the $C_1$-$C_{32}$ alkyl group can be a $C_1$-$C_{32}$ heteroalkyl group (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, or 32 carbon units in length). As used herein, "heteroalkyl group" refers to a saturated or unsaturated, substituted or unsubstituted, straight-chained, branched, or cyclic aliphatic chain that contains at least 1 heteroatom (e.g., O, S, N, and/or P) in the core of the molecule (i.e., the carbon backbone).

In certain embodiments of the substituent $R_8$, the hydrophobic group is an aryl group. The aryl group can be any substituted or unsubstituted aryl or heteroaryl group, wherein the heteroaryl group is an aromatic 5- or 6-membered monocyclic group, 9- or 10-membered bicyclic group, and 11- to 14-membered tricyclic group, which has at least one heteroatom (e.g., O, S, or N) in at least one of the rings. Each ring of the heteroaryl group containing a heteroatom can contain one or two oxygen or sulfur atoms and/or from one to four nitrogen atoms, provided that the total number of heteroatoms in each ring is four or less and each ring has at least one carbon atom. The fused rings completing the bicyclic and tricyclic groups may contain only carbon atoms and may be saturated, partially saturated, or unsaturated. The nitrogen, oxygen, and sulfur atoms optionally can be oxidized, and the nitrogen atoms optionally can be quaternized. Heteroaryl groups that are bicyclic or tricyclic must include at least one fully aromatic ring, but the other fused ring or rings can be aromatic or non-aromatic. In some embodiments, the aryl compound is phenyl, naphthyl, pyrrolyl, isoindolyl, indolizinyl, indolyl, furanyl, benzofuranyl, benzothiophenyl, thiophenyl, pyridyl, acridinyl, naphthyridinyl, quinolinyl, isoquinolinyl, isoxazolyl, oxazolyl, benzoxazolyl, isothiazolyl, thiazolyl, benzthiazolyl, imidazolyl, thiadiazolyl, tetrazolyl, triazolyl, oxadiazolyl, benzimidazolyl, purinyl, pyrazolyl, pyrazinyl, pteridinyl, quinoxalinyl, phthalazinyl, quinazolinyl, triazinyl, phenazinyl, cinnolinyl, pyrimidinyl, or pyridazinyl.

In certain embodiments of the substituent $R_8$, the hydrophobic group is a $C_1$-$C_{32}$ fluoroalkyl group or a $C_1$-$C_{32}$ fluoroaryl group. As used herein, the terms "fluoroalkyl" and "fluoroaryl" refer to any alkyl group or aryl group, respectively, with one or more fluorine atoms.

The ammonium salt of Formula VI can have any suitable anion counter ion (i.e., "Z"). In some embodiments, the anion counter ion ("Z") comprises an element selected from a halogen (e.g., fluoride, chloride, bromide, or iodide), sulfur, carbon, nitrogen, phosphorous, and a combination thereof. An exemplary list of anions comprises fluoride, chloride, bromide, iodide, sulfide, sulfite, sulfate, sulfonated, bisulfate, bisulfite, thiosulfate, carbonate, bicarbonate, nitrate, nitrite, phosphate, hydrogen phosphate, dihydrogen phosphate, phosphite, hydrogen phosphite, dihydrogen phosphite, hexafluorophosphate, carboxylate, acetate, mesylate, tosylate, or triflate. In certain embodiments, Z is selected from fluoride, chloride, bromide, mesylate, tosylate, or a combination thereof.

In certain embodiments, the cationic associative monomer unit is derived from an acrylamide salt monomer of Formula VII:

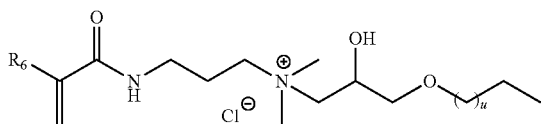

VII wherein $R_6$ is H or $C_1$-$C_{10}$ alkyl (e.g., $(CH_2)_tCH_3$) wherein t is an integer from 0 to 9 (i.e., 0, 1, 2, 3, 4, 5, 6, 7, 8, or 9), and u is an integer from 0 to 30 (e.g., from 2 to 30, from 4 to 30, from 6 to 30, from 8 to 30, from 5 to 25, from 10 to 30, from 12 to 30, from 15 to 25, from 16 to 30, from 18 to 30, from 20 to 30, from 22 to 30, or from 24 to 30). In some embodiments, "$C_1$-$C_{10}$ alkyl" refers to a branched $C_1$-$C_{10}$ alkyl group. In some embodiments, the acrylamide salt of Formula VII is a mixture of two or more such acrylamides, such that the average (rounded to the nearest integer) value of u is an integer from 0 to 30 (e.g., from 2 to 30, from 4 to 30, from 6 to 30, from 8 to 30, from 5 to 25, from 10 to 30, from 12 to 30, from 15 to 25, from 16 to 30, from 18 to 30, from 20 to 30, from 22 to 30, or from 24 to 30). In certain embodiments, the acrylamide salt of Formula VII is "MAPTAC-C12 derivative" (i.e., where $R_6$ is $CH_3$ and u is 10).

In another embodiment, the associative monomer unit is an anionic associative monomer unit. Generally, the anionic associative monomer unit is derived from an acrylate and/or an acrylamide monomer of Formula VIII:

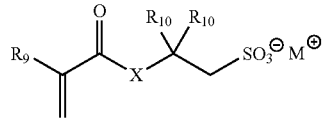

VIII wherein $R_9$ is H or $C_1$-$C_{10}$ alkyl (e.g., $(CH_2)_vCH_3$) wherein v is an integer from 0 to 9 (i.e., 0, 1, 2, 3, 4, 5, 6, 7, 8, or 9), X is O or NH, M is any cation, and each $R_{10}$ is independently H or a hydrophobic group. In some embodiments, "$C_1$-$C_{10}$ alkyl" refers to a branched $C_1$-$C_{10}$ alkyl group. As used herein, the term "hydrophobic group" refers to an alkyl group, an aryl group, a fluoroalkyl group, or a fluoroaryl group.

In certain embodiments of the substituent $R_{10}$, the hydrophobic group is a $C_1$-$C_{32}$ alkyl group (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, or 32 carbon units in length). In some embodiments, the $C_1$-$C_{32}$ alkyl group is saturated, unsaturated, branched, straight-chained, cyclic, or a combination thereof. An exemplary list of $C_1$-$C_{32}$ alkyl groups is methyl, ethyl, n-propyl, iso-propyl, n-butyl, sec-butyl, tert-butyl, n-pentyl, sec-pentyl, neo-pentyl, hexyl, heptyl, octyl, nonyl, lauryl, stearyl, cetyl, behenyl, cyclopentyl, cyclohexyl, propenyl, 2-butenyl, 3-butenyl, 2-pentenyl, 3-pentenyl, or 4-pentenyl. In certain embodiments, the $C_1$-$C_{32}$ alkyl group is further substituted with one or more alkyl substituents, aryl substituents, heteroatoms, or combinations thereof. In some embodiments, the $C_1$-$C_{32}$ alkyl group can be a $C_1$-$C_{32}$ heteroalkyl group (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, or 32 carbon units in length). As used herein, "heteroalkyl group" refers to a saturated or unsaturated, substituted or unsubstituted, straight-chained, branched, or cyclic aliphatic group that contains at least 1 heteroatom (e.g., O, S, N, and/or P) in the core of the molecule (i.e., the carbon backbone).

In certain embodiments of the substituent $R_{10}$, the hydrophobic group is an aryl group. The aryl group can be any substituted or unsubstituted aryl or heteroaryl group, wherein the heteroaryl group is an aromatic 5- or 6-membered monocyclic group, 9- or 10-membered bicyclic group, and 11- to 14-membered tricyclic group, which has at least one heteroatom (e.g., O, S, or N) in at least one of the rings.

Each ring of the heteroaryl group containing a heteroatom can contain one or two oxygen or sulfur atoms and/or from one to four nitrogen atoms, provided that the total number of heteroatoms in each ring is four or less and each ring has at least one carbon atom. The fused rings completing the bicyclic and tricyclic groups may contain only carbon atoms and may be saturated, partially saturated, or unsaturated. The nitrogen, oxygen, and sulfur atoms optionally can be oxidized, and the nitrogen atoms optionally can be quaternized. Heteroaryl groups that are bicyclic or tricyclic must include at least one fully aromatic ring, but the other fused ring or rings can be aromatic or non-aromatic. In some embodiments, the aryl compound is phenyl, naphthyl, pyrrolyl, isoindolyl, indolizinyl, indolyl, furanyl, benzofuranyl, benzothiophenyl, thiophenyl, pyridyl, acridinyl, naphthyridinyl, quinolinyl, isoquinolinyl, isoxazolyl, oxazolyl, benzoxazolyl, isothiazolyl, thiazolyl, benzthiazolyl, imidazolyl, thiadiazolyl, tetrazolyl, triazolyl, oxadiazolyl, benzimidazolyl, purinyl, pyrazolyl, pyrazinyl, pteridinyl, quinoxalinyl, phthalazinyl, quinazolinyl, triazinyl, phenazinyl, cinnolinyl, pyrimidinyl, or pyridazinyl.

In certain embodiments of the substituent $R_{10}$, the hydrophobic group is a $C_1$-$C_{32}$ fluoroalkyl group or a $C_1$-$C_{32}$ fluoroaryl group. As used herein, the terms "fluoroalkyl" and "fluoroaryl" refer to any alkyl group or aryl group, respectively, with one or more fluorine atoms.

The sulfonate salt can have any suitable cation counter ion (i.e., "M"). For example, the cation counter ion ("M") can be a proton, ammonium, a quaternary amine, a cation of an alkali metal, a cation of an alkaline earth metal, a cation of a transition metal, a cation of a rare-earth metal, a main group element cation, or a combination thereof. In some embodiments, the cation counter ion is a proton or a cation of lithium, sodium, potassium, magnesium, calcium, manganese, iron, zinc, or a combination thereof. In certain embodiments, M is selected from hydrogen, lithium, sodium, potassium, or a combination thereof.

The one or more associative monomer unit(s) can be present in the associative polymer in any suitable amount. The associative polymer can comprise a sum total of about 10 mol % or less of the one or more associative monomer unit(s), for example, about 9 mol % or less, about 8 mol % or less, about 7 mol % or less, about 6 mol % or less, about 5 mol % or less, about 4 mol % or less, about 3 mol % or less, about 2 mol % or less, or about 1 mol % or less. Alternatively, or in addition to, the associative polymer can comprise about 0.005 mol % or more of the one or more associative monomer unit(s), for example, about 0.01 mol % or more, about 0.1 mol % or more, about 0.25 mol % or more, about 0.3 mol % or more, about 0.4 mol % or more, or about 0.5 mol % or more. Thus, the associative polymer can comprise the one or more associative monomer unit(s) in a concentration bounded by any two of the aforementioned endpoints. The associative polymer can comprise from about 0.005 mol % to about 10 mol % of the one or more associative monomer unit(s), for example, from about 0.005 mol % to about 9 mol %, from about 0.005 mol % to about 8 mol %, from about 0.005 mol % to about 7 mol %, from about 0.005 mol % to about 6 mol %, from about 0.005 mol % to about 5 mol %, from about 0.005 mol % to about 4 mol %, from about 0.005 mol % to about 3 mol %, from about 0.005 mol % to about 2 mol %, from about 0.005 mol % to about 1 mol %, from about 0.01 mol % to about 1 mol %, from about 0.1 mol % to about 1 mol %, from about 0.25 mol % to about 1 mol %, from about 0.3 mol % to about 1 mol %, from about 0.4 mol % to about 1 mol %, from about 0.5 mol % to about 1.0 mol %, from about 0.01 mol % to about 0.5 mol %, or from about 0.01 mol % to about 0.25 mol %.

In some embodiments, the associative polymer comprises an associative monomer unit derived from a monomer of Formula II, a monomer unit derived from a monomer of Formula I, and an additional cationic monomer unit. In some embodiments, the associative polymer(s) comprises an associative monomer unit derived from a monomer of Formula II, a monomer unit derived from a monomer of Formula I, and an additional monomer unit derived from DMAEA.MCQ. In some embodiments, the associative polymer comprises an associative monomer unit derived from a monomer of Formula II, an additional monomer unit derived from acrylamide, and an additional monomer unit derived from DMAEA.MCQ. In certain embodiments, the associative polymer comprises an associative monomer unit derived from VISIOMER® monomer C18PEG1105MA, an additional monomer unit derived from acrylamide, and an additional monomer unit derived from DMAEA.MCQ.

In some embodiments, the associative polymer comprises an associative monomer unit derived from a monomer of Formula II, a monomer unit derived from a monomer of Formula I, and an additional anionic monomer unit. In some embodiments, the associative polymer comprises an associative monomer unit derived from a monomer of Formula II, a monomer unit derived from a monomer of Formula I, and an additional monomer unit derived from sodium acrylate. In some embodiments, the associative polymer comprises an associative monomer unit derived from a monomer of Formula II, an additional monomer unit derived from acrylamide, and an additional monomer unit derived from sodium acrylate. In certain embodiments, the associative polymer comprises an associative monomer unit derived from VISIOMER® monomer C18PEG1105MA, an additional monomer unit derived from acrylamide, and an additional monomer unit derived from sodium acrylate.

In some embodiments, the associative polymer comprises an associative monomer unit derived from a monomer of Formula VI, a monomer unit derived from a monomer of Formula I, and an additional cationic monomer unit. In some embodiments, the associative polymer comprises an associative monomer unit derived from a monomer of Formula VI, a monomer unit derived from a monomer of Formula I, and an additional monomer unit derived from DMAEA.MCQ. In some embodiments, the associative polymer comprises an associative monomer unit derived from a monomer of Formula VI, an additional monomer unit derived from acrylamide, and an additional monomer unit derived from DMAEA.MCQ. In certain embodiments, the associative polymer comprises an associative monomer unit derived from MAPTAC-C12 derivative of Formula VII, an additional monomer unit derived from acrylamide, and an additional monomer unit derived from DMAEA.MCQ.

In some embodiments, the associative polymer comprises an associative monomer unit derived from a monomer of Formula VI, a monomer unit derived from a monomer of Formula I, and an additional anionic monomer unit. In some embodiments, the associative polymer comprises an associative monomer unit derived from a monomer of Formula VI, a monomer unit derived from a monomer of Formula I, and an additional monomer unit derived from sodium acrylate. In some embodiments, the associative polymer comprises an associative monomer unit derived from a monomer of Formula VI, an additional monomer unit derived from acrylamide, and an additional monomer unit derived from sodium acrylate. In certain embodiments, the associative polymer comprises an associative monomer unit derived from MAPTAC-C12 derivative of Formula VII, an additional monomer unit derived from acrylamide, and an additional monomer unit derived from sodium acrylate.

In some embodiments, the associative polymer comprises an associative monomer unit derived from a monomer of Formula VIII, a monomer unit derived from a monomer of Formula I, and an additional cationic monomer unit. In some embodiments, the associative polymer comprises an associative monomer unit derived from a monomer of Formula VIII, a monomer unit derived from a monomer of Formula I, and an additional monomer unit derived from DMAEA.MCQ.

In some embodiments, the associative polymer comprises an associative monomer unit derived from a monomer of Formula VIII, a monomer unit derived from a monomer of Formula I, and an additional anionic monomer unit. In some embodiments, the associative polymer comprises an associative monomer unit derived from a monomer of Formula VIII, a monomer unit derived from a monomer of Formula I, and an additional monomer unit derived from sodium acrylate.

In some embodiments, the associative polymer is of Formula $AP_1$:

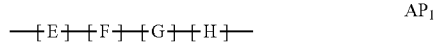

$AP_1$ wherein E is one or more associative monomer unit(s), F is one or more additional monomer unit(s), G is one or more monomer unit(s) derived from a monomer of Formula I, H is optionally present and is one or more piperidine-2,6-dione unit(s), wherein the one or more piperidine-2,6-dione(s) are formed upon cyclization of an acrylamide nitrogen of the monomer unit derived from the monomer of Formula I ("G") on a carbonyl of the additional monomer unit ("F").

In some embodiments, the associative polymer is of formula $AP_2$:

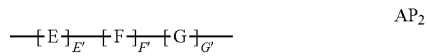

$AP_2$ wherein E is one or more associative monomer unit(s), E' is a more percentage value of from about 0.005 to about 10, F is one or more additional monomer unit(s), F' is a mole percentage value of from about 0.005 to about 90, G is one or more monomer unit(s) derived from a monomer of Formula I, and G' is a mole percentage value of from about 10 to about 99.99. Monomer unit E is defined by the associative monomer units described herein. Monomer units F and G are defined by the additional monomer units and monomer units derived from the monomer of Formula I, respectively, described herein.

As described herein, the associative polymer of formula $AP_2$ can exist as an alternating polymer, random polymer, block polymer, graft polymer, linear polymer, branched polymer, cyclic polymer, or a combination thereof. Thus, E, F, and G can exist in any suitable order (e.g., EGF, EFG, GEF, GFE, FEG, or FGE), including repeating individual units (e.g., EEFFFGG, EFGGEFEE, EFGEEE, EEEEFG, etc.).

The amount of one or more associative monomer unit(s) ("E"), and the sum total of one or more additional monomer unit(s) ("F"+"G") are as described previously for the one or more associative monomer unit(s) and the sum total of one or more additional monomer unit(s).

In some embodiments, the associative polymer of formula $AP_2$ undergoes charge degradation to provide an associative polymer of formula $AP_3$:

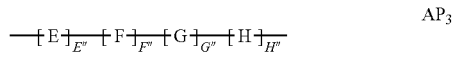

$AP_3$ wherein E is one or more associative monomer unit(s), E" is a mole percentage value of from about 0.005 to about 10, F is one or more additional monomer unit(s), F" is a mole percentage value of from about 0.005 to about 90, G is one or more monomer unit(s) derived from a monomer of Formula I, G" is a mole percentage value of from about 10 to about 99.99, H is one or more piperidine-2,6-dione unit(s), wherein the one or more piperidine-2,6-dione(s) are formed upon cyclization of an acrylamide nitrogen of the monomer unit derived from a monomer of Formula I ("G") on a carbonyl of the additional monomer unit ("F"), and H" is a mole percentage value of from about 0 (i.e., trace amounts) to about 10. As used herein, "charge degradation" refers to the process of a monomer unit derived from a monomer of Formula I cyclizing on a charged additional monomer unit (i.e., a cationic and/or anionic monomer unit), such that the charged substituent of the additional monomer unit is displaced, and thus, the polymer has less cationic monomer units and/or less anionic monomer units. Without wishing to be bound by any particular theory, it is believed that the charge degradation can occur spontaneously, or can be facilitated by one or more components in the polymer solution.

In certain embodiments, the associative polymers is of formula $AP_3$:

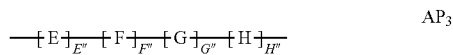

$AP_3$ wherein E is one or more associative monomer unit(s), E" is a mole percentage value of from about 0.005 to about 10, F is one or more additional monomer unit(s), F" is a mole percentage value of from about 0.005 to about 90, G is one or more monomer unit(s) derived from a monomer of Formula I, G" is a mole percentage value of from about 10 to about 99.99, H is one or more units of the formula

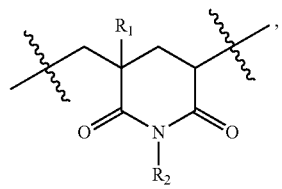

wherein $R_1$ is H or $C_1$-$C_4$ alkyl (e.g., methyl, ethyl, n-propyl, iso-propyl, n-butyl, sec-butyl, or tert-butyl) and $R_2$ is H or an organic group, and H" is a mole percentage value of from about 0 (i.e., trace amounts) to about 10. In certain embodiments, $R_1$ and $R_2$ are hydrogen.

As described herein, the associative polymer of formula $AP_3$ can exist as an alternating polymer, random polymer, block polymer, graft polymer, linear polymer, branched polymer, cyclic polymer, or a combination thereof. Thus, E, F, G, and H can exist in any suitable order (e.g., EGFH, EGHF, EHFG, EHGF, EFGH, EFHG, FEGH, FEHG, FHEG, FHGE, FGEH, FGHE, GHFE, GHEF, GEFH, GEHF, GFHE, GFEH, HEFG, HEGF, HGEF, HGFE, HFEG, or HFGE), including repeating individual units (e.g., EEFFFGGHHH, EFGGEFEEH, EFGEEEHH, HHHEEEEFG, etc.).

In certain embodiments, the associative polymer is of formula $AP_4$:

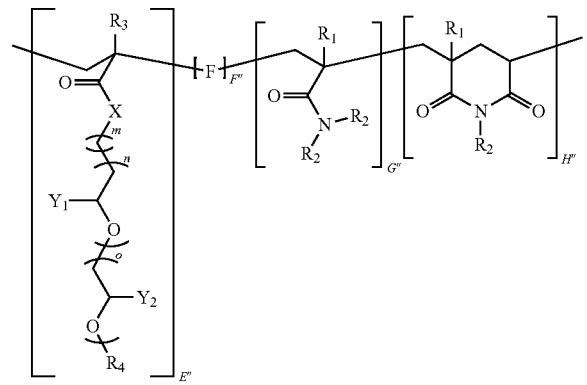

wherein each $R_1$ is independently H or $C_1$-$C_4$ alkyl (e.g., methyl, ethyl, n-propyl, iso-propyl, n-butyl, sec-butyl, or tert-butyl), each $R_2$ is independently H or an organic group, $R_3$ is H or $C_1$-$C_{10}$ alkyl (e.g., $(CH_2)_k CH_3$), wherein k is an integer from 0 to 9 (i.e., 0, 1, 2, 3, 4, 5, 6, 7, 8, or 9), X is O or NH, m, n, and o are independently integers from 0 to 100, wherein when $(n+o) \leq 3$, m is at least 7, each $Y_1$ and $Y_2$ are independently H or $C_1$-$C_4$ alkyl (e.g., methyl, ethyl, n-propyl, iso-propyl, n-butyl, sec-butyl, or tert-butyl), and $R_4$ is H or a hydrophobic group, E" is a mole percentage value of from about 0.005 to about 10, F is one or more additional monomer unit(s), F" is a mole percentage value of from about 0.005 to about 90, G" is a mole percentage value of from about 10 to about 99.99, and H" is a mole percentage value of from about 0 (i.e., trace amounts) to about 10. In some embodiments, "$C_1$-$C_{10}$ alkyl" refers to a branched $C_1$-$C_{10}$ alkyl group.

In certain embodiments of the associative polymer of formula $AP_4$, F is derived from a diallyldimethylammonium chloride ("DADMAC") monomer. In certain embodiments of the associative polymer of formula $AP_4$, F is derived from a 2-(acryloyloxy)-N,N,N-trimethylethanaminium chloride ("DMAEA.MCQ") monomer.

In certain embodiments, the associative polymer is of formula $AP_5$:

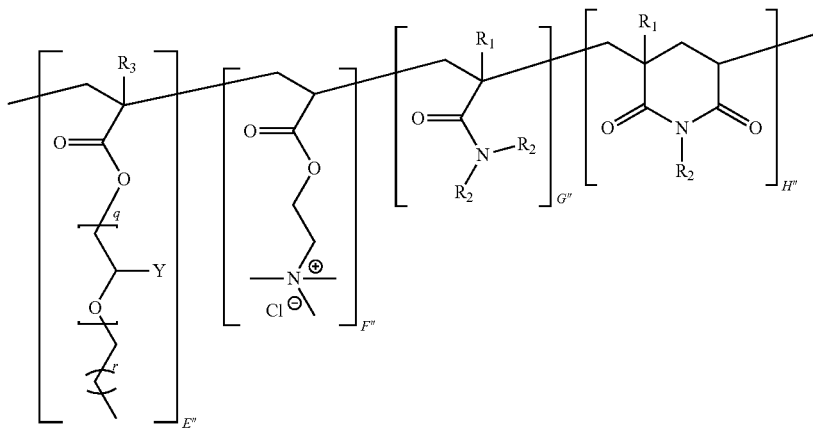

wherein each $R_1$ is independently H or $C_1$-$C_4$ alkyl (e.g., methyl, ethyl, n-propyl, iso-propyl, n-butyl, sec-butyl, or tert-butyl), each $R_2$ is independently H or an organic group, $R_3$ is H or $C_1$-$C_{10}$ alkyl (e.g., $(CH_2)_k CH_3$), wherein k is an integer from 0 to 9, q is an integer from 2 to 100, r is an integer from 0 to 30, each Y is independently H or $CH_3$, E" is a mole percentage value of from about 0.005 to about 10, F" is a mole percentage value of from about 0.005 to about 90, G" is a mole percentage value of from about 10 to about 99.99, and H" is a mole percentage value of from about 0 (i.e., trace amounts) to about 10. In some embodiments, "$C_1$-$C_{10}$ alkyl" refers to a branched $C_1$-$C_{10}$ alkyl group.

In certain embodiments, the associative polymer is of formula AP$_6$:

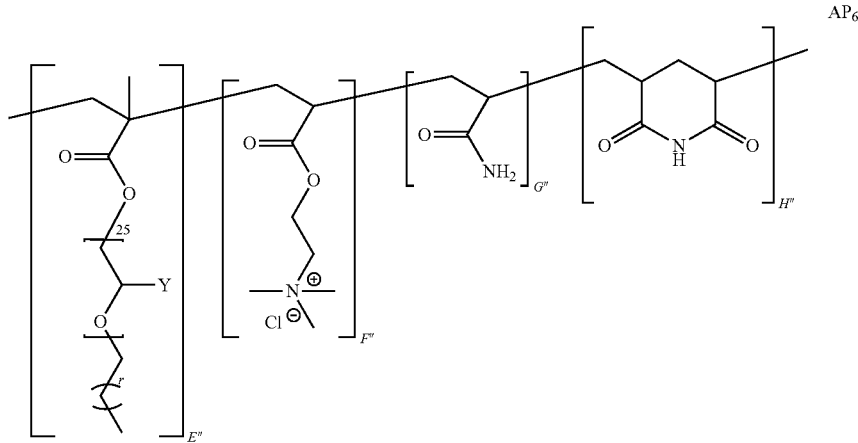

wherein r is an integer from 0 to 30 (e.g., from 2 to 30, from 4 to 30, from 6 to 30, from 8 to 30, from 10 to 30, from 12 to 30, from 16 to 30, from 18 to 30, from 20 to 30, from 22 to 30, or from 24 to 30), each Y is independently H or CH$_3$, E" is a mole percentage value of from about 0.005 to about 10, F" is a mole percentage value of from about 0.005 to about 90, G" is a mole percentage value of from about 10 to about 99.99, and H" is a mole percentage value of from about 0 (i.e., trace amounts) to about 10. In certain embodiments, r is an integer from 14 to 16.

In certain embodiments, the associative polymer is of formula AP$_7$:

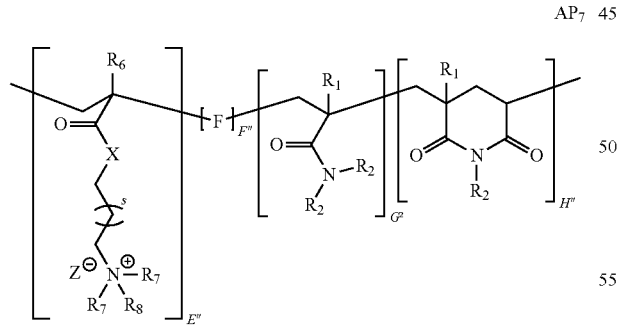

wherein each R$_1$ is independently H or C$_1$-C$_4$ alkyl (e.g., methyl, ethyl, n-propyl, iso-propyl, n-butyl, sec-butyl, or tert-butyl), each R$_2$ is independently H or an organic group, R$_6$ and R$_7$ are each independently H or C$_1$-C$_{10}$ alkyl (e.g., (CH$_2$)$_t$CH$_3$) wherein t is an integer from 0 to 9, X is O or NH, s is an integer from 0 to 20, Z is any anion, and R$_8$ is a hydrophobic group, E" is a mole percentage value of from about 0.005 to about 10, F is one or more additional monomer unit(s), F" is a mole percentage value of from about 0.005 to about 90, G" is a mole percentage value of from about 10 to about 99.99, and H" is a mole percentage value of from about 0 (i.e., trace amounts) to about 10. In some embodiments, "C$_1$-C$_{10}$ alkyl" refers to a branched C$_1$-C$_{10}$ alkyl group.

In certain embodiments, the associative polymer is of formula APB:

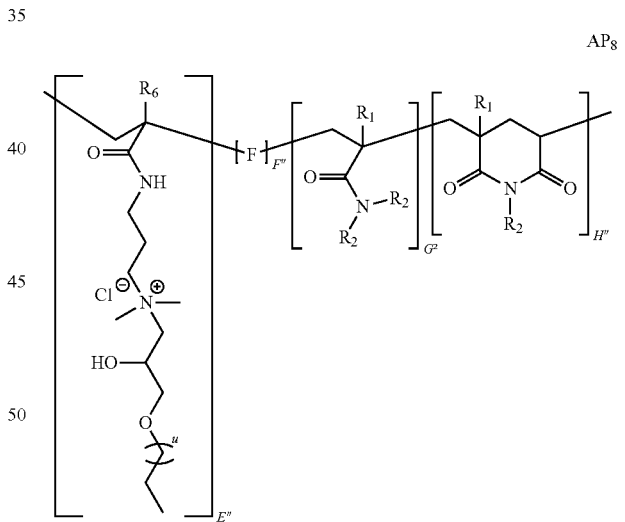

wherein each R$_1$ is independently H or C$_1$-C$_4$ alkyl (e.g., methyl, ethyl, n-propyl, iso-propyl, n-butyl, sec-butyl, or tert-butyl), each R$_2$ is independently H or an organic group, R$_6$ is H or C$_1$-C$_{10}$ alkyl (e.g., (CH$_2$)$_t$CH$_3$) wherein t is an integer from 0 to 9, and u is an integer from 0 to 30, E" is a mole percentage value of from about 0.005 to about 10, F" is a mole percentage value of from about 0.005 to about 90, G" is a mole percentage value of from about 10 to about 99.99, and H" is a mole percentage value of from about 0 (i.e., trace amounts) to about 10. In some embodiments, "C$_1$-C$_{10}$ alkyl" refers to a branched C$_1$-C$_{10}$ alkyl group.

In certain embodiments, the associative polymer is of formula $AP_9$:

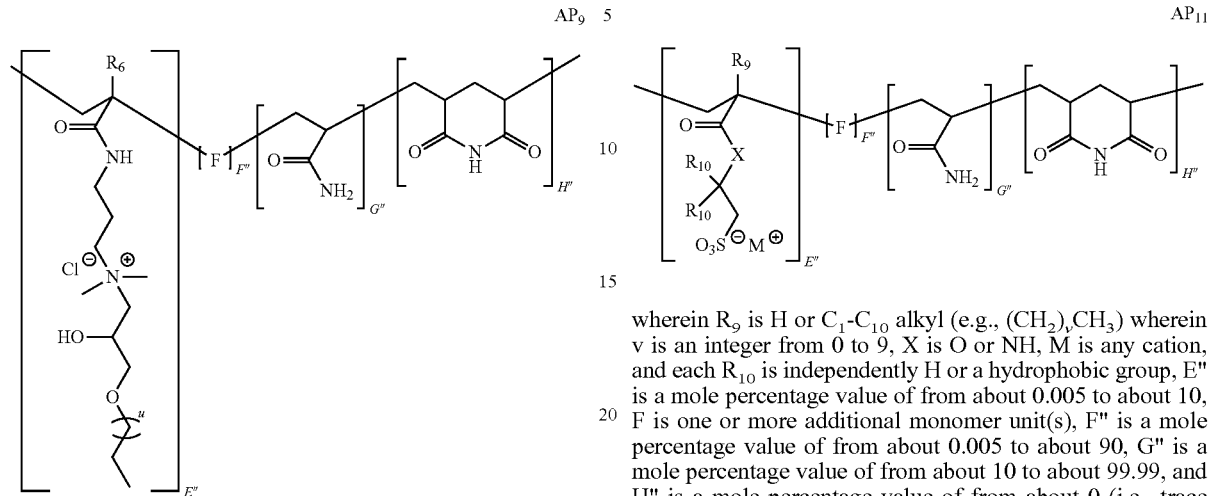

wherein $R_6$ is H or $C_1$-$C_{10}$ alkyl (e.g., $(CH_2)_tCH_3$) wherein t is an integer from 0 to 9, and u is an integer from 0 to 30, E" is a mole percentage value of from about 0.005 to about 10, F" is a mole percentage value of from about 0.005 to about 90, G" is a mole percentage value of from about 10 to about 99.99, and H" is a mole percentage value of from about 0 (i.e., trace amounts) to about 10. In some embodiments, "$C_1$-$C_{10}$ alkyl" refers to a branched $C_1$-$C_{10}$ alkyl group.

In certain embodiments of the associative polymers of formula $AP_7$-9 (i.e., $AP_7$, $AP_8$, or $AP_9$), F is derived from one or more monomers selected from acrylic acid, methacrylic acid, or salts thereof.

In certain embodiments, the associative polymer is of formula $AP_{10}$:

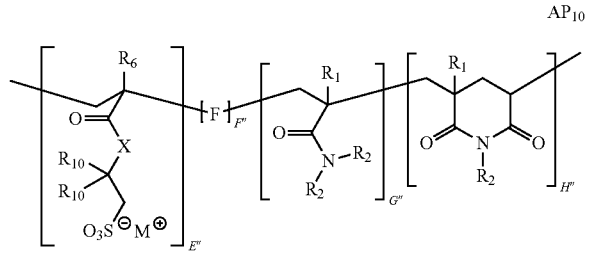

wherein each $R_1$ is independently H or $C_1$-$C_4$ alkyl (e.g., methyl, ethyl, n-propyl, iso-propyl, n-butyl, sec-butyl, or tert-butyl), each $R_2$ is independently H or an organic group, $R_9$ is H or $C_1$-$C_{10}$ alkyl (e.g., $(CH_2)_vCH_3$) wherein v is an integer from 0 to 9, X is O or NH, M is any cation, and each $R_{10}$ is independently H or a hydrophobic group, E" is a mole percentage value of from about 0.005 to about 10, F is one or more additional monomer unit(s), F" is a mole percentage value of from about 0.005 to about 90, G" is a mole percentage value of from about 10 to about 99.99, and H" is a mole percentage value of from about 0 (i.e., trace amounts) to about 10. In some embodiments, "$C_1$-$C_{10}$ alkyl" refers to a branched $C_1$-$C_{10}$ alkyl group.

In certain embodiments, the associative polymer is of formula $AP_{11}$:

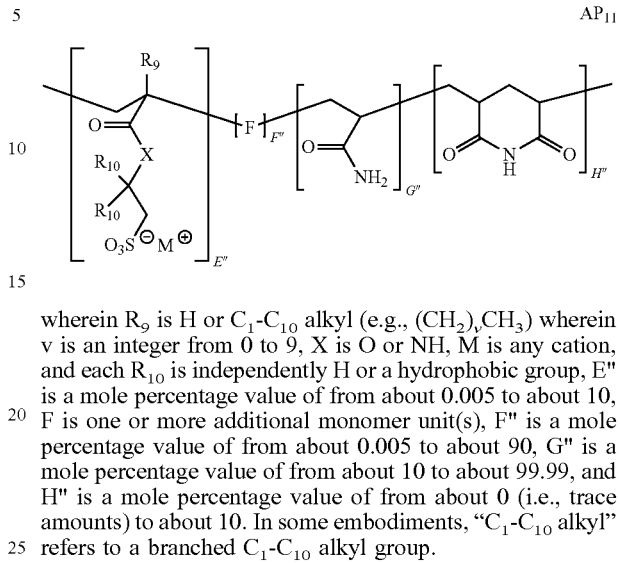

wherein $R_9$ is H or $C_1$-$C_{10}$ alkyl (e.g., $(CH_2)_vCH_3$) wherein v is an integer from 0 to 9, X is O or NH, M is any cation, and each $R_{10}$ is independently H or a hydrophobic group, E" is a mole percentage value of from about 0.005 to about 10, F is one or more additional monomer unit(s), F" is a mole percentage value of from about 0.005 to about 90, G" is a mole percentage value of from about 10 to about 99.99, and H" is a mole percentage value of from about 0 (i.e., trace amounts) to about 10. In some embodiments, "$C_1$-$C_{10}$ alkyl" refers to a branched $C_1$-$C_{10}$ alkyl group.

As described herein, the associative polymers of formula $AP_4$-$AP_{11}$ (i.e., $AP_4$, $AP_5$, $AP_6$, $AP_7$, $AP_8$, $AP_9$, $AP_{10}$, or $AP_{11}$) can exist as an alternating polymer, random polymer, block polymer, graft polymer, linear polymer, branched polymer, cyclic polymer, or a combination thereof. Thus, the monomer units can exist in any suitable order, including repeating individual units.

The presence of the monomer unit H can be detected by any suitable method. In some embodiments, monomer H is detected by $^{13}CNMR$, $^1HNMR$, IR spectroscopy, or a combination thereof.

The abundance of the monomer unit H can be determined by any suitable method. In some embodiments, the abundance of the monomer unit H can be determined by relative comparison of the peak integrations of a $^{13}CNMR$ spectrum, $^1HNMR$ spectrum, IR spectrum, or a combination thereof.

In some embodiments of the associative polymers of formula $AP_{3-11}$ (i.e., $AP_3$, $AP_4$, $AP_5$, $AP_6$, $AP_7$, $AP_8$, $AP_9$, $AP_{10}$, or $AP_{11}$), E" is from about 0.005 mol % to about 10 mol % (e.g., from about 0.005 mol % to about 9 mol %, from about 0.005 mol % to about 8 mol %, from about 0.005 mol % to about 7 mol %, from about 0.005 mol % to about 6 mol %, from about 0.005 mol % to about 5 mol %, from about 0.005 mol % to about 4 mol %, from about 0.005 mol % to about 3 mol %, or from about 0.005 mol % to about 2 mol %), F" is from about 0.005 mol % to about 90 mol % (e.g., from about 0.005 mol % to about 80 mol %, from about 0.005 mol % to about 70 mol %, from about 0.005 mol % to about 60 mol %, from about 0.005 mol % to about 50 mol %, from about 0.005 mol % to about 40 mol %, from about 0.005 mol % to about 35 mol %, from about 0.005 mol % to about 30 mol %, from about 0.005 mol % to about 25 mol %, from about 0.005 mol % to about 20 mol %, from about 0.005 mol % to about 16 mol %, from about 0.005 mol % to about 12 mol %, from about 0.005 mol % to about 10 mol %, from about 2 mol % to about 20 mol %, from about 4 mol % to about 20 mol %, from about 6 mol % to about 20 mol %, from about 4 mol % to about 16 mol %, from about 4 mol % to about 12 mol %, or from about 4 mol % to about 10 mol %), G" is from about 10 mol % to about 99.99 mol % (e.g., from about 10 mol % to about 99.99 mol %, from about 20 mol % to about 99.99 mol %, from about 30 mol % to about 99.99 mol %, from about 40 mol % to about 99.99 mol %, from about 50 mol % to about 99.99 mol %, from about 60 mol % to about 99.99 mol %, from about 70 mol % to about 99.99 mol %, from about 80 mol % to about 99.99 mol %, from about 80 mol % to about 99.95 mol %, from about 80 mol % to about 99.9 mol %, from about 80 mol % to about 99.5 mol %, from about 80 mol % to about 99 mol %, from about 80 mol % to about 97 mol %, from about 80 mol % to about 95 mol %, from about 80 mol % to about 92 mol %, from about 80 mol % to about 90 mol %, from about 84 mol % to about 99 mol %, from about 84 mol % to about 94 mol %, from about 84 mol % to about 95 mol %, from about 84 mol % to about 92 mol %, or from about 84 mol % to about 90 mol %), and H" is from about 0 mol % (i.e., trace amounts) to about 10 mol % (e.g., from about 0.001 mol % to about 10 mol %, from about 0.001 mol % to about 9 mol %, from about 0.001 mol % to about 8 mol %, from about 0.001 mol % to about 7 mol %, from about 0.001 mol % to about 6 mol %, from about 0.001 mol % to about 5 mol %, from about 0.001 mol % to about 4 mol %, from about 0.001 mol % to about 3 mol %, or from about 0.001 mol % to about 2 mol %).

In certain embodiments of the associative polymers of formula ($AP_{3-11}$) (i.e., $AP_3$, $AP_4$, $AP_5$, $AP_6$, $AP_7$, $AP_8$, $AP_9$, $AP_{10}$, or $AP_{11}$), E" is from about 0.005 mol % to about 1 mol % (e.g., from about 0.01 mol % to about 1 mol %, from about 0.1 mol % to about 1 mol %, from about 0.25 mol % to about 1 mol %, from about 0.3 mol % to about 1 mol %, from about 0.4 mol % to about 1 mol %, from about 0.5 mol % to about 1.0 mol %, from about 0.01 mol % to about 0.5 mol %, or from about 0.01 mol % to about 0.25 mol %), F" is from about 4 mol % to about 10 mol % (e.g., from about 4 mol % to about 9 mol %, from about 4 mol % to about 8 mol %, from about 4 mol % to about 7 mol %, from about 4 mol % to about 6 mol %, from about 4 mol % to about 5 mol %, from about 5 mol % to about 10 mol %, from about 6 mol % to about 10 mol %, from about 7 mol % to about 10 mol %, from about 8 mol % to about 10 mol %, from about 9 mol % to about 10 mol %, or from about 6 mol % to about 8 mol %), G" is from about 84 mol % to about 90 mol % (e.g., from about 85 mol % to about 90 mol %, from about 86 mol % to about 90 mol %, from about 87 mol % to about 90 mol %, from about 88 mol % to about 90 mol %, from about 89 mol % to about 90 mol %, from about 84 mol % to about 89 mol %, from about 84 mol % to about 88 mol %, from about 84 mol % to about 87 mol %, from about 84 mol % to about 86 mol %, from about 84 mol % to about 85 mol %, or from about 86 mol % to about 88 mol %), and H" is from about 0 mol % (i.e., trace amounts) to about 6 mol % (e.g., from about 0.001 mol % to about 5 mol %, from about 0.001 mol % to about 4 mol %, from about 0.001 mol % to about 3 mol %, or from about 0.001 mol % to about 2 mol %, from about 0.001 mol % to about 1 mol %, from about 0.01 mol % to about 1 mol %, from about 0.1 mol % to about 1 mol %, from about 0.25 mol % to about 1 mol %, from about 0.3 mol % to about 1 mol %, from about 0.4 mol % to about 1 mol %, from about 0.5 mol % to about 1.0 mol %, from about 0.01 mol % to about 0.5 mol %, or from about 0.01 mol % to about 0.25 mol %).

The polymerization to form the associative polymer can be carried out according to any suitable polymerization known in the art. For example, the associative polymer can be made by emulsion polymerization, dispersion polymerization, solution polymerization, gel polymerization, or a combination thereof. The polymerization to form the associative polymer can occur through any suitable mechanism. For example, the polymerization can occur through cationic polymerization, anionic polymerization, free-radical polymerization, coordination polymerization, or combinations thereof. Typically, polymerization occurs through free radical polymerization.

In some embodiments, the polymerization to form the associative polymer comprises one or more polymerization component(s). In certain embodiments, the one or more polymerization component(s) are not removed from the reaction mixture such that one or more of the polymerization component(s) remains in the polymer solution, the polymer wet gel, and/or the associative polymer powder. In other embodiments, the one or more polymerization component(s) are removed such that the one or more polymerization component(s) are not present in the polymer solution, the polymer wet gel, and/or the associative polymer powder. In some embodiments, the one or more polymerization component(s) are transformed such that one or more transformed polymerization components are present in the polymer solution, the polymer wet gel, and/or the associative polymer powder. An exemplary list of polymerization components is an initiator, a chain transfer agent, a chelant, a redox agent, a buffer, and a combination thereof.

In some embodiments, the polymerization comprises one or more initiator(s). The initiator can be any suitable initiator. In some embodiments, the initiator is a free radical initiator. In certain embodiments, the initiator is selected from the group of azobis compounds. An exemplary list of initiators is 2,2'-azobis(2,4-dimethyl valeronitrile), 2,2'-azobis(4-methoxy-2,4-dimethyl valeronitrile), 1,1'-azobis(cyclohexane-1-carbonitrile), 2,2'-azobis(2-methylbutyronitrile), 2,2'-azobis(2-methylpropionamidine)dihydrochloride, 2,2'-azobis[2-(2-imidazolin-2-yl)propane]dihydrochloride, 2,2'-azobis[N-(2-carboxyethyl)-2-methylpropionamidine] hydrate (anhydride), and 2,2'-azobis[2-(2-imidazolin-2-yl) propane].

In some embodiments, the polymerization comprises one or more chain transfer agent(s). The chain transfer agent can be any suitable chain transfer agent. An exemplary list of chain transfer agents is carbon tetrachloride, carbon tetrabromide, bromotrichloromethane, pentaphenylethane, sodium formate, sodium hypophosphite, thiophenol, 4,4'-thiobisbenzenethiol, 4-methylbenzenethiol, and aliphatic thiols such as isooctyl 3-mercaptopropionate, tert-nonyl mercaptan, and N-acetyl-L-cysteine, N-2-mercaptoethyl)acetamide, glutathione, N-(2-mercaptopropionyl)glycine, and 2-mercaptoethanol.

In some embodiments, the polymerization comprises one or more chelant(s). The chelant can be any suitable chelant. In certain embodiments, the chelant is a polydentate organic compound. An exemplary list of chelating agents is diethylenetriaminepentaacetic acid ("DTPA"), ethylenediaminetetraacetic acid ("EDTA"), nitrilotriacetic acid ("NTA"), diethylenetriaminepentaacetic acid, N,N-bis(carboxymethyl)-L-glutamic acid, trisodium N-(hydroxyethyl)-ethylenediaminetriacetate, adipic acid, and salts thereof.

In some embodiments, the polymerization comprises one or more redox agent(s). The redox agent can be any suitable redox agent. In some embodiments, the redox agent aids in terminating the polymerization. In certain embodiments, the redox reagent is an organic peroxide, an inorganic peroxide, or a combination thereof. An exemplary list of redox agents is sodium bisulfite; a thiosulfate, ferrous ammonium sulfate; ascorbic acid, an amine, a hypophosphite, sodium bromate, a chlorate, a permanganate, ammonium persulfate, potassium persulfate, sodium persulfate, t-butyl hydrogen peroxide, hydrogen peroxide, ozone, and salts thereof. In some embodiments, the redox agent is added as a redox pair such that one agent participates in reduction and one agent participates in oxidation. In certain embodiments, the redox agent is the initiator.

In some embodiments, the polymerization comprises a buffer system. The buffer system can be any suitable organic and/or inorganic buffer system. In certain embodiments, the buffer system comprises an organic and/or inorganic acid and/or base capable of controlling the pH lower than about 6 (e.g., from about 0 to about 6, from about 1 to about 6, from about 2 to about 6, from about 3 to about 6, from about 4 to about 6, from about 5 to about 6, from about 0 to about 1, from about 0 to about 2, from about 0 to about 3, from about 0 to about 4, or from about 0 to about 5). An exemplary list of buffers is adipic acid, pimelic acid, glutaric acid, citric acid, acetic acid, an inorganic acid (e.g., phosphoric acid), an amine, and salts thereof.

The associative polymer is a powder in the absence of the solvent. In some embodiments, the associative polymer powder comprises one or associative polymer(s). For example, the solution can comprise a plurality (e.g., at least two polymer molecules) of associative polymer(s), wherein the associative polymer(s) have the same molecular structure (i.e., one associative polymer), or the associative polymer powder can comprise a plurality of associative polymer(s), wherein the associative polymer(s) have varying molecular structures (i.e., more than one associative polymer(s)). The one or more associative polymer(s) can be any suitable polymer. For example, the one or more associative polymer(s) can be homopolymers, copolymers, terpolymers, or greater, or a combination thereof. In certain embodiments, the one or more associative polymer(s) are terpolymers.

The associative polymer powder can have any suitable particle shape. In some embodiments, the associative polymer powder particles are non-spherical. Without wishing to be bound to any particular theory, it is believed that non-spherical particles are generally formed when the associative polymer powder has been manufactured by a gel-, spray-, or drum-based process (e.g., via cutting and drying). In some embodiments, the associative polymer powder particles are spherical. Without wishing to be bound to any particular theory, it is believed that spherical particles are generally formed when the associative polymer powder has been manufactured by a bead-based process.

The associative polymer powder can have any suitable moisture content. Generally, the moisture content is from about 0 wt. % to about 30 wt. % (e.g., from about 0.01 wt. % to about 30 wt. %, from about 0.1 wt. % to about 30 wt. %, or from about 1 wt. % to about 30 wt. %). In certain embodiments of the associative polymer powder, the moisture content is from about 0 wt. % to about 25 wt. % (e.g., from about 0.01 wt. % to about 25 wt. %, from about 0.1 wt. % to about 25 wt. %, or from about 1 wt. % to about 25 wt. %). In certain embodiments of the associative polymer powder, the moisture content is from about 0 wt. % to about 20 wt. % (e.g., from about 0.01 wt. % to about 20 wt. %, from about 0.1 wt. % to about 20 wt. %, from about 0.1 wt. % to about 10 wt. %, or from about 1 wt. % to about 20 wt. %). In certain embodiments, the moisture content is about 10 wt. %.

The associative polymer powder can have any suitable intrinsic viscosity. For example, the associative polymer powder can have an intrinsic viscosity of from about 0.05 dL/g to about 40 dL/g (e.g., from about 0.05 dL/g to about 30 dL/g, from about 0.05 dL/g to about 20 dL/g, from about 0.05 dL/g to about 15 dL/g, from about 0.05 dL/g to about 10 dL/g, from about 0.05 dL/g to about 7 dL/g, from about 0.05 dL/g to about 6 dL/g, from about 0.05 dL/g to about 5 dL/g, from about 0.05 dL/g to about 4 dL/g, from about 0.05 dL/g to about 3 dL/g, from about 0.05 dL/g to about 2 dL/g, from about 0.05 dL/g to about 1 dL/g, from about 0.05 dL/g to about 0.5 dL/g, from about 0.1 dL/g to about 7 dL/g, from about 0.1 dL/g to about 6 dL/g, from about 0.5 dL/g to about 5 dL/g, from about 0.1 dL/g to about 10 dL/g, from about 0.5 dL/g to about 10 dL/g, from about 0.1 dL/g to about 15 dL/g, from about 0.1 dL/g to about 40 dL/g, from about 0.5 dL/g to about 40 dL/g, from about 0.5 dL/g to about 40 dL/g, from about 1 dL/g to about 40 dL/g, or from about 0.5 dL/g to about 15 dL/g. In some embodiments, the associative polymer powder has an intrinsic viscosity from about 0.05 dL/g to about 7. In certain embodiments, the associative polymer powder has an intrinsic viscosity of from about 0.5 dL/g to about 5 dL/g.

In certain embodiments, the associative polymer powder comprises particles that have been dry cut (e.g., cut or ground) to their median particle size. As used herein, the term "dry cut" refers to a process where the cutting used to achieve the median particle size, described herein, is not facilitated by the addition of water. Without wishing to be bound by any particular theory, it is believed that the process described herein does not require such fine particles that would necessitate "wet cutting" to avoid problems such as dusting.

The associative polymer powder can have any suitable median particle size (i.e., median particle diameter). The median particle size can be determined by any suitable method known in the art. Generally, the median particle size is determined by a Horiba Laser Scattering Particle Size Distribution Analyzer LA-950. The associative polymer powder can have a median particle size of about 10 microns or more, for example, about 50 microns or more, about 100 microns or more, about 200 microns or more, about 250 microns or more, about 300 microns or more, about 350 microns or more, about 400 microns or more, about 450 microns or more, or about 500 microns or more. Alternatively, or in addition, the associative polymer powder can have a median particle size of about 10,000 microns or less, for example, about 8,000 microns or less, about 6,000 microns or less, about 4,000 microns or less, about 2,000 microns or less, or about 1,000 microns or less. Thus, the associative polymer powder can have a median particle size bounded by any two of the aforementioned endpoints. The associative polymer powder can have a median particle size of from about 10 microns to about 10,000 microns, for example, from about 50 microns to about 10,000 microns, from about 100 microns to about 10,000 microns, from about 10 microns to about 8,000 microns, from about 10 microns to about 6,000 microns, from about 10 microns to about 4,000 microns, from about 10 microns to about 2,000 microns, from about 10 microns to about 1,000 microns, from about 250 microns to about 10,000 microns, from about 300 microns to about 10,000 microns, from about 350 microns to about 10,000 microns, from about 400 microns to about 10,000 microns, from about 450 microns to about 10,000 microns, from about 500 microns to about 10,000 microns, from about, from about 100 microns to about 2,000 microns, from about 200 microns to about 2,000 microns, from about 350 microns to about 2,000 microns, from about 400 microns to about 2,000 microns, from about 450 microns to about 2,000 microns, or from about 500 microns to about 2,000 microns.

In some embodiments, the process for making the associative polymer powder comprises networking one or more associative polymer(s). As used herein, "networking" refers to chemical coordination of one polymer chain to an adjacent polymer chain to promote a different physical property. The networking technique can comprise any suitable chemical coordination. Generally, the networking of one or more associative polymer(s) does not comprise covalently linking adjacent polymer chains. For example, the chemical coordination can occur through ionic bonding, hydrogen bonding, hydrophobic interactions, dipolar interactions, Van der Waals forces, or a combination thereof.

In an embodiment, at least a portion of the networking occurs between the associative monomer units of different polymer chains (i.e., intermolecular interactions). Without wishing to be bound by any particular theory, it is believed that associative monomer units interact momentarily through weak chemical interactions (i.e., ionic bonding, hydrogen bonding, hydrophobic interactions, dipolar interactions, Van der Waals forces, or a combination thereof), resulting in networking adjacent acrylamide-based polymer(s) temporarily. As used herein, "networking associative polymer(s) temporarily" refers to an interaction, which can be controlled by the level of dilution, the presence of a surfactant, or a combination thereof. Thus, the networking of associative polymer(s) is reversible, thereby allowing for powders, gels, or low viscosity liquid media to be prepared and/or subsequently dispersed in a solvent. In certain embodiments, the solution does not contain a surfactant other than the cyclodextrin polymer.

The solution comprises a solvent. The solvent can be any solvent suitable for an industrial process (e.g., mining or papermaking) that will not interfere with the performance of the associative polymer. The solvent can be a single chemical or a mixture of two or more chemicals. In certain embodiments, the solvent is water. In some embodiments, the solvent is fresh water. The fresh water can be surface water or ground water. In certain embodiments, the fresh water is further treated prior to use in the solutions and methods provided herein. In certain embodiments, the solvent is process water. The process water can be obtained from any suitable step in the industrial process (e.g., cooling water). In some embodiments, the process water is further treated prior to use in the solutions and methods provided herein. In some embodiments, the solvent is tap water. As used herein, "synthetic tap water" refers to water that is formulated to mimic the ionic strength and conductivity of tap water.

The solution comprises a cyclodextrin polymer. As used herein, the term "a cyclodextrin polymer" can refer to one or more cyclodextrin polymer(s). For example, the solution can comprise a plurality (e.g., at least two polymer molecules) of cyclodextrin polymer(s), wherein the cyclodextrin polymer(s) have the same molecular structure (i.e., one cyclodextrin polymer), or the solution can comprise a plurality of cyclodextrin polymer(s), wherein the cyclodextrin polymer(s) have varying molecular structures (i.e., more than one cyclodextrin polymer(s)). The one or more cyclodextrin polymer(s) can be any suitable polymer. For example, the one or more cyclodextrin polymer(s) can be homopolymers, copolymers, terpolymers, or greater, or a combination thereof. In certain embodiments, the one or more cyclodextrin polymer(s) are copolymers.

The solution can have any suitable cyclodextrin polymer content. The solution can have a cyclodextrin polymer content of about 10 wt. % or less, for example, about 5 wt. % or less, about 1 wt. % or less, about 0.9 wt. % or less, about 0.8 wt. % or less, about 0.7 wt. % or less, about 0.6 wt. % or less, about 0.5 wt. % or less, about 0.4 wt. % or less, about 0.3 wt. % or less, about 0.2 wt. % or less, or about 0.1 wt. % or less. Alternatively, or in addition to, the solution can have a cyclodextrin polymer content of about 0.0001 wt. % or more, for example, about 0.0005 wt. % or more, about 0.001 wt. % or more, about 0.005 wt. % or more, about 0.01 wt. % or more, or about 0.05 wt. % or more. Thus, the solution can have a cyclodextrin polymer content bounded by any two of the aforementioned endpoints. The solution can have a cyclodextrin polymer content from about 0.0001 wt. % to about 10 wt. %, for example, from 0.0001 wt. % to about 5 wt. %, from about 0.0001 wt. % to about 1 wt. %, from about 0.05 wt. % to about 5 wt. %, from about 0.05 wt. % to about 10 wt. %, from about 0.0005 wt. % to about 1 wt. %, from about 0.001 wt. % to about 1 wt. %, from about 0.005 wt. % to about 1 wt. %, from about 0.005 wt. % to about 1 wt. %, from about 0.01 wt. % to about 1 wt. %, from about 0.05 wt. % to about 1 wt. %, from about 0.0001 wt. % to about 0.9 wt. %, from about 0.0001 wt. % to about 0.8 wt. %, from about 0.0001 wt. % to about 0.7 wt. %, from about 0.0001 wt. % to about 0.6 wt. %, from about 0.0001 wt. % to about 0.5 wt. %, from about 0.0001 wt. % to about 0.4 wt. %, from about 0.0001 wt. % to about 0.3 wt. %, from about 0.0001 wt. % to about 0.2 wt. %, from about 0.0001 wt. % to about 0.1 wt. %, from about 0.001 wt. % to about 0.1 wt. %, or from about 0.01 wt. % to about 0.1 wt. %.

The cyclodextrin polymer can be cationic, anionic, amphoteric, non-ionic, or zwitterionic. In some embodiments, the cyclodextrin polymer is cationic. As used herein, "cationic" polymers refer to polymers containing cationic monomer units or a combination of cationic monomer units and non-ionic monomer units. In some embodiments, the cyclodextrin polymer is anionic. As used herein, "anionic" polymers refer to polymers containing anionic monomer units or a combination of anionic monomer units and non-ionic monomer units. In some embodiments, the cyclodextrin polymer is amphoteric. As used herein, "amphoteric" polymers refer to polymers containing cationic monomer units and anionic monomer units, or cationic monomer units, anionic monomer units, and non-ionic monomer units. In some embodiments, the cyclodextrin polymer is non-ionic. As used herein, "non-ionic" polymers refer to polymers containing non-ionic monomer units. In some embodiments, the cyclodextrin polymer is zwitterionic. As used herein, "zwitterionic" polymers refer to polymers containing zwitterionic monomer units or a combination of zwitterionic monomer units and cationic monomer units, anionic monomer units, and/or non ionic monomer units. In certain embodiments, the cyclodextrin polymer is non-ionic.

The cyclodextrin polymer can exist as any suitable structure type. For example, the cyclodextrin polymer can exist as an alternating polymer, random polymer, block polymer, graft polymer, linear polymer, branched polymer, cyclic polymer, or a combination thereof. The cyclodextrin polymer can contain a single monomer unit, or any suitable number of different monomer units. For example, the cyclodextrin polymer can contain 2 different monomer units, 3 different monomer units, 4 different monomer units, 5 different monomer units, or 6 different monomer units. The cyclodextrin polymer's monomer units can exist in any suitable concentration and any suitable proportion.

In some embodiments, the cyclodextrin polymer is a liquid. In some embodiments, the cyclodextrin polymer is a gel. In some embodiments, the cyclodextrin polymer is a powder. Accordingly, the cyclodextrin polymer can have any suitable median particle size (i.e., median particle diameter). The median particle size can be determined by any suitable method known in the art. Generally, the median particle size is determined by a Horiba Laser Scattering Particle Size Distribution Analyzer LA-950. The cyclodextrin polymer can have a median particle size of about 10 microns or more, for example, about 50 microns or more, about 100 microns or more, about 200 microns or more, about 250 microns or more, about 300 microns or more, about 350 microns or more, about 400 microns or more, about 450 microns or more, or about 500 microns or more. Alternatively, or in addition, the cyclodextrin polymer powder can have a median particle size of about 10,000 microns or less, for example, about 8,000 microns or less, about 6,000 microns or less, about 4,000 microns or less, about 2,000 microns or less, or about 1,000 microns or less. Thus, the cyclodextrin polymer can have a median particle size bounded by any two of the aforementioned endpoints. The cyclodextrin polymer can have a median particle size of from about 10 microns to about 10,000 microns, for example, from about 50 microns to about 10,000 microns, from about 100 microns to about 10,000 microns, from about 10 microns to about 8,000 microns, from about 10 microns to about 6,000 microns, from about 10 microns to about 4,000 microns, from about 10 microns to about 2,000 microns, from about 10 microns to about 1,000 microns, from about 250 microns to about 10,000 microns, from about 300 microns to about 10,000 microns, from about 350 microns to about 10,000 microns, from about 400 microns to about 10,000 microns, from about 450 microns to about 10,000 microns, from about 500 microns to about 10,000 microns, from about, from about 100 microns to about 2,000 microns, from about 200 microns to about 2,000 microns, from about 350 microns to about 2,000 microns, from about 400 microns to about 2,000 microns, from about 450 microns to about 2,000 microns, or from about 500 microns to about 2,000 microns. In certain embodiments, the cyclodextrin polymer exists as a solution (e.g., the cyclodextrin polymer liquid, gel, or powder is solubilized in water or other appropriate solvent).

In some embodiments, the solution comprises an cyclodextrin polymer, wherein the cyclodextrin polymer (i.e., absent of networking) has a weight average molecular weight of from about 2 kDa to about 10,000 kDa. The cyclodextrin polymer can have a weight average molecular weight of about 10,000 kDa or less, for example, about 8,000 kDa or less, about 6,000 kDa or less, about 5,000 kDa or less, about 4,000 kDa or less, about 3,000 kDa or less, about 2,500 kDa or less, about 2,000 kDa or less, about 1,800 kDa or less, about 1,600 kDa or less, about 1,400 kDa or less, about 1,200 kDa or less, about 1,000 kDa or less, about 900 kDa, or less, about 800 kDa, or less, about 700 kDa or less, about 600 kDa or less, about 500 kDa or less, about 400 kDa or less, or about 300 kDa or less. Alternatively, or in addition, the cyclodextrin polymer can have a weight average molecular weight of about 2 kDa or more, for example, about 10 kDa or more, about 20 kDa or more, about 30 kDa or more, about 40 kDa or more, about 50 kDa or more, about 100 kDa or more, about 200 kDa or more, or about 300 kDa or more. Thus, the cyclodextrin polymer can have a weight average molecular weight bounded by any two of the aforementioned endpoints. For example, the cyclodextrin polymer can have a weight average molecular weight of from about 2 kDa to about 10,000 kDa, from about 10 kDa to about 10,000 kDa, from about 50 kDa to about 10,000 kDa, from about 100 kDa to about 10,000 kDa, from about 200 kDa to about 10,000 kDa, from about 300 kDa to about 10,000 kDa, from about 2 kDa to about 8,000 kDa, from about 2 kDa to about 6,000 kDa, from about 2 kDa to about 3,000 kDa, from about 2 kDa to about 1,000 kDa, from about 2 kDa to about 800 kDa, from about 2 kDa to about 500 kDa, from about 2 kDa to about 300 kDa, from about 10 kDa to about 2,000 kDa, from about 200 kDa to about 2,000 kDa, from about 200 kDa to about 2,500 kDa, from about 200 kDa to about 3,000 kDa, from about 200 kDa to about 4,000 kDa, from about 10 kDa to about 5,000 kDa, from about 10 kDa to about 1,000 kDa, from about 10 kDa to about 500 kDa, from about 10 kDa to about 300 kDa, or from about 200 kDa to about 5,000 kDa.

The cyclodextrin polymer comprises a cyclodextrin monomer unit. The cyclodextrin monomer unit can be any suitable monomer unit. In some embodiments, the cyclodextrin monomer unit is selected from any one or more of methyl, ethyl, propyl, vinyl, propenyl, acetyl, hydroxypropyl, or hydroxyethyl derivatives of α-cyclodextrin, β-cyclodextrin or γ-cyclodextrin, or a combination thereof. As used herein, the term "derivative" refers to a cyclodextrin unit that has been functionalized as described here. In some embodiments, the cyclodextrin monomer unit is selected from α-cyclodextrin, β-cyclodextrin, γ-cyclodextrin, or a combination thereof. In some embodiments, the cyclodextrin polymer comprises α-cyclodextrin, β-cyclodextrin and γ-cyclodextrin, or a combination thereof and/or derivatives of α-cyclodextrin, β-cyclodextrin and γ-cyclodextrin, or a combination thereof. In certain embodiments, the cyclodextrin polymer comprises a β-cyclodextrin monomer unit.

The cyclodextrin polymer can have any suitable amount of the cyclodextrin monomer unit. The cyclodextrin polymer can have a cyclodextrin monomer unit content of about 100 wt. % or less, for example, about 95 wt. % or less, about 90 wt. % or less, about 85 wt. % or less, about 80 wt. % or less, about 75 wt. % or less, about 70 wt. % or less, about 65 wt. % or less, or about 60 wt. % or less. Alternatively, or in addition to, the cyclodextrin polymer can have a cyclodextrin monomer unit content of about 1 wt. % or more, for example, about 10 wt. % or more, about 20 wt. % or more, about 30 wt. % or more, about 40 wt. % or more, or about 50 wt. % or more. Thus, the cyclodextrin polymer can have a cyclodextrin monomer unit content bounded by any two of the aforementioned endpoints. The cyclodextrin polymer can have a cyclodextrin monomer unit content from about 1 wt. % to about 100 wt. %, for example, from about 1 wt. % to about 95 wt. %, from about 1 wt. % to about 90 wt. %, from about 1 wt. % to about 85 wt. %, from about 1 wt. % to about 80 wt. %, from about 1 wt. % to about 75 wt. %, from about 1 wt. % to about 70 wt. %, from about 1 wt. % to about 65 wt. %, from about 1 wt. % to about 60 wt. %, from about 10 wt. % to about 100 wt. %, from about 20 wt. % to about 100 wt. %, from about 30 wt. % to about 100 wt. %, from about 40 wt. % to about 100 wt. %, from about 50 wt. % to about 100 wt. %, from about 10 wt. % to about 90 wt. %, from about 20 wt. % to about 80 wt. %, from about 30 wt. % to about 70 wt. %, or from about 40 wt. % to about 100 wt. %.

The cyclodextrin polymer can be synthesized by any suitable polymerization method. For example, the cyclodextrin polymer can be made through free radical polymerization, addition polymerization, condensation polymerization, free radical addition polymerization, cationic addition polymerization, anionic addition polymerization, emulsion polymerization, solution polymerization, suspension polymerization, precipitation polymerization, or a combination thereof. In certain embodiments, polymerization occurs through free radical polymerization. The cyclodextrin polymer can be synthesized with any suitable additional monomer capable of polymerization by any of the methods described herein. In some embodiments, the cyclodextrin polymer is synthesized by a condensation polymerization. In certain embodiments, the cyclodextrin polymer is a condensation reaction product of epichlorohydrin and a cyclodextrin monomer unit, a cyclodextrin derivative monomer unit, or a combination thereof. In some embodiments, the cyclodextrin polymer is synthesized by free radical polymerization. In certain embodiments, the cyclodextrin polymer is synthesized by free radical polymerization of a vinyl-containing cyclodextrin derivative. In certain embodiments, the cyclodextrin polymer is synthesized by free radical polymerization of a vinyl-containing cyclodextrin derivative in combination with other suitable vinyl monomers.

The solution comprises any suitable molar ratio of the sum total of cyclodextrin monomer units in the cyclodextrin polymer to the sum total of the one or more associative monomer unit(s). In some embodiments, the molar ratio of the sum total cyclodextrin monomer units in the cyclodextrin polymer to the sum total of the one or more associative monomer unit(s) is from about 1:1 to about 50:1. In some embodiments, the molar ratio of the sum total cyclodextrin monomer units in the cyclodextrin polymer to the sum total of the one or more associative monomer unit(s) is from about 2:1 to about 25:1. In certain embodiments, the molar ratio of the sum total cyclodextrin monomer units in the cyclodextrin polymer to the sum total of the one or more associative monomer unit(s) is from about 5:1 to about 10:1.

The solution can have any suitable intrinsic viscosity. For example, the solution can have an intrinsic viscosity of from about 0.05 dL/g to about 40 dL/g (e.g., from about 0.05 dL/g to about 30 dL/g, from about 0.05 dL/g to about 20 dL/g, from about 0.05 dL/g to about 15 dL/g, from about 0.05 dL/g to about 10 dL/g, from about 0.05 dL/g to about 7 dL/g, from about 0.05 dL/g to about 6 dL/g, from about 0.05 dL/g to about 5 dL/g, from about 0.05 dL/g to about 4 dL/g, from about 0.05 dL/g to about 3 dL/g, from about 0.05 dL/g to about 2 dL/g, from about 0.05 dL/g to about 1 dL/g, from about 0.05 dL/g to about 0.5 dL/g, from about 0.1 dL/g to about 7 dL/g, from about 0.1 dL/g to about 6 dL/g, from about 0.5 dL/g to about 5 dL/g, from about 0.1 dL/g to about 10 dL/g, from about 0.5 dL/g to about 10 dL/g, from about 0.1 dL/g to about 15 dL/g, from about 0.1 dL/g to about 40 dL/g, from about 0.5 dL/g to about 40 dL/g, from about 0.5 dL/g to about 40 dL/g, from about 1 dL/g to about 40 dL/g, or from about 0.5 dL/g to about 15 dL/g. In some embodiments, the solution has an intrinsic viscosity from about 0.05 dL/g to about 7. In certain embodiments, the solution has an intrinsic viscosity of from about 0.5 dL/g to about 5 dL/g.

Intrinsic viscosity ("IV") is defined by a series of reduced specific viscosity ("RSV") measurements extrapolated to the limit of infinite dilution, i.e., when the concentration of powder is equal to zero. The RSV is measured at a given powder concentration and temperature and calculated as follows:

$$RSV = \frac{\left(\frac{\eta}{\eta_0} - 1\right)}{c} = \frac{\left(\frac{t}{t_0} - 1\right)}{c}$$

wherein $\eta$ is viscosity of the powder solution, $\eta_0$ is viscosity of the solvent at the same temperature, an t is elution time of the solution, $t_0$ is elution time of solvent, and c is concentration (g/dL) of the powder in solution. Thus, intrinsic viscosity is defined by dL/g. Variables t and to are measured using powder solution and solvent that is in 1.0 N sodium nitrate solution with a Cannon Ubbelohde semimicro dilution viscometer (size 75) at 30±0.02° C.

The solution can have any suitable Huggins constant. For example, the solution can have a Huggins constant from about 0.1 to about 20 (e.g., from about 0.1 to about 15, from about 0.1 to about 10, from about 0.3 to about 10, from about 0.1 to about 5, from about 0.5 to about 20, from about 0.5 to about 10, from about 1 to about 20, from about 1 to about 10, or from about 1 to about 5). In some embodiments, the solution can have a Huggins constant of from about 0.3 to about 10 as determined by varying concentrations of the solution, wherein the concentrations have been chosen such that they produce a value of $$\left(\frac{t}{t_0}\right)$$

between about 1.2 and 2.2, in a 1.0 N sodium nitrate solution. In some embodiments, the solution can have a Huggins constant of from about 0.3 to about 5 as determined by varying concentrations of the powder, wherein the concentrations have been chosen such that they produce a value of $$\left(\frac{t}{t_0}\right)$$

between about 1.2 and 2.2, in a 1.0 N sodium nitrate solution. In certain embodiments, the solution has a Huggins constant of from about 0.6 to about 3 as determined by varying concentrations of the powder, wherein the concentrations have been chosen such that they produce a value of $$\left(\frac{t}{t_0}\right)$$

between about 1.2 and 2.2, in a 1.0 N sodium nitrate solution. The Huggins constant is calculated as follows:

$$\text{Huggins constant} = \frac{\text{slope of } (RSV \sim c)}{IV^2}$$

The solution comprising an associative polymer, a cyclodextrin polymer, and a solvent has a lower bulk viscosity than an identical solution without the cyclodextrin polymer, under otherwise identical concentrations and conditions. Accordingly, in some embodiments, a 1 wt. % associative polymer solution in water at 25° C. with a cyclodextrin polymer has a bulk viscosity (cP) of less than about 50% (e.g., less than about 45%, or less than about 40%) of a bulk viscosity of an identical solution without a cyclodextrin polymer, under otherwise identical concentrations and conditions. In some embodiments, a 1 wt. % associative polymer solution in water at 25° C. with a cyclodextrin polymer has a bulk viscosity (cP) of less than about 35% (e.g., less than about 30%, or less than about 25%) of a bulk viscosity of an identical solution without a cyclodextrin polymer, under otherwise identical concentrations and conditions. In certain embodiments, a 1 wt. % associative polymer solution in water at 25° C. has a bulk viscosity (cP) of less than about 20% (e.g., less than about 15%, or less than about 10%) of a bulk viscosity of an identical solution without a cyclodextrin polymer, under otherwise identical concentrations and conditions.

The solution can be used in any suitable application that requires an associative polymer powder to be converted to a solution based polymer product. In some embodiments, the solution is added to a paper sheet precursor. As used herein, the term "paper sheet precursor" refers to any component of the papermaking process upstream of the point at which water removal begins (e.g., the table). As used herein, the terms "upstream" and "downstream" refer to components of the papermaking process that are procedurally towards the pulper, and procedurally towards the reel, respectively. Accordingly, the solution can be added to pulp (e.g., virgin pulp, recycled pulp, or a combination thereof), pulp slurry, cellulosic fibers, a solution used for any of the aforementioned components, and any combination thereof at any one or more of various locations during the papermaking process, up to and including a headbox. In certain embodiments, the solution can be added to the pulp slurry in a pulper, latency chest, reject refiner chest, disk filter or Decker feed or accept, whitewater system, pulp stock storage chests (either low density ("LD"), medium consistency ("MC"), or high consistency ("HC")), blend chest, machine chest, headbox, save-all chest, or combinations thereof.

In some embodiments, the solution is added to the paper sheet precursor upstream of a wet end of a paper machine (e.g., before the wet end). As used herein, the term "wet end" refers to any component of the papermaking process including the headbox and downstream thereof. Accordingly, the solution can be added to any component of the papermaking process up to but not including the headbox. In certain embodiments, the solution is added to a stock prep section of the paper machine. As used herein, "stock prep section" refers to any component of the papermaking process wherein the pulp is refined and/or blended. For example, the solution can be added to the pulp stock storage chests (either low density ("LD"), medium consistency ("MC"), or high consistency ("HC")), blend chest, machine chest, save-all chest, or a combination thereof.

In some embodiments, the pulp slurry comprises recycled fibers. The recycled fibers can be obtained from a variety of paper products or fiber containing products, such as paperboard, newsprint, printing grades, sanitary or other paper products. In some embodiments, these products can comprise, for example, old corrugated cardboard ("OCC"), old newsprint ("ONP"), mixed office waste ("MOW"), magazines, books, or a combination thereof. In some embodiments, the pulp slurry comprises virgin fibers. In embodiments comprising virgin fibers, the pulp can be derived from softwood, hardwood, or blends thereof. In certain embodiments, the virgin pulp can include bleached or unbleached Kraft, sulfite pulp or other chemical pulps, and groundwood ("GW") or other mechanical pulps such as, for example, thermomechanical pulp ("TMP").

The solution can be added to the papermaking process in any suitable amount to achieve the desired weight percentage of associative polymer actives. The solution can be added to the papermaking process in an amount to achieve about 0.01 wt. % or more of associative polymer actives, for example, about 0.05 wt. % or more, about 0.1 wt. % or more, about 0.2 wt. % or more, about 0.3 wt. % or more, about 0.4 wt. % or more, about 0.5 wt. % or more, about 0.6 wt. % or more, about 0.7 wt. % or more, about 0.8 wt. % or more, about 0.9 wt. % or more, or about 1.0 wt. % or more. Alternatively, or in addition to, the solution can be added to the papermaking process in an amount to achieve about 10 wt. % or less of associative polymer actives, for example, about 9 wt. % or less, about 8 wt. % or less, about 7 wt. % or less, about 6 wt. % or less, about 5 wt. % or less, about 4 wt. % or less, about 3 wt. % or less, about 2 wt. % or less, or about 1 wt. % or less. Thus, the solution can be added to the papermaking process in any suitable amount bounded by any two of the aforementioned endpoints to achieve the desired weight percentage of associative polymer actives. The solution can be added to the papermaking process in an amount to achieve from about 0.01 wt. % to about 10 wt. % of associative polymer actives, for example, from about 0.01 wt. % to about 9 wt. %, from about 0.01 wt. % to about 8 wt. %, from about 0.01 wt. % to about 7 wt. %, from about 0.01 wt. % to about 6 wt. %, from about 0.01 wt. % to about 5 wt. %, from about 0.01 wt. % to about 4 wt. %, from about 0.01 wt. % to about 3 wt. %, from about 0.01 wt. % to about 2 wt. %, from about 0.01 wt. % to about 1 wt. %, from about 0.05 wt. % to about 1 wt. %, from about 0.1 wt. % to about 1 wt. %, from about 0.2 wt. % to about 1 wt. %, from about 0.3 wt. % to about 1 wt. %, from about 0.4 wt. % to about 1 wt. %, from about 0.5 wt. % to about 1 wt. %, from about 0.6 wt. % to about 1 wt. %, from about 0.7 wt. % to about 1 wt. %, from about 0.8 wt. % to about 1 wt. %, from about 0.9 wt. % to about 1 wt. %, from about 1 wt. % to about 10 wt. %, from about 0.01 wt. % to about 2 wt. %, or from about 0.01 wt. % to about 5 wt. %.

The solution can be added to the papermaking process in any suitable dosage of the associative polymer (lbs/ton actives). As used herein, the terms "lbs/ton actives" or "lb/ton actives" refer to the pounds of associative polymer actives per ton of fiber. The solution can be added to the papermaking process in a dosage of the associative polymer of at least about 0.1 lbs/ton actives. For example, the solution can be added to the papermaking process in a dosage of the associative polymer of at least about 0.5 lbs/ton actives, at least about 1 lbs/ton actives, at least about 2 lbs/ton actives, at least about 3 lbs/ton actives, at least about 4 lbs/ton actives, at least about 5 lbs/ton actives, at least about 6 lbs/ton actives, at least about 7 lbs/ton actives, at least about 8 lbs/ton actives, at least about 9 lbs/ton actives, at least about 10 lbs/ton actives, at least about 11 lbs/ton actives, at least about 12 lbs/ton actives, at least about 13 lbs/ton actives, at least about 14 lbs/ton actives, or at least about 15 lbs/ton actives.

In some embodiments, the associative polymer can improve strength of the resulting paper product. In some embodiments, the associative polymer increases the drainage time reduction percentage (%). Additionally, in certain embodiments, the associative polymer can improve one or more additional properties of the resulting paper product. For example, in addition to strength, the associative polymer can improve opacity, smoothness, porosity, dimensional stability, pore size distribution, linting propensity, density, stiffness, formation, compressibility, or a combination thereof. Without wishing to be bound to any particular theory, many of the aforementioned paper properties are believed to be dependent on the bonds that exist between the cellulosic fibers in the paper. It is believed that the networking of these fibers may be enhanced by certain chemical aids and additionally by the mechanical beating and/or refining step(s) of the papermaking process, during which the fibers become more flexible and the available surface area is increased.

In certain embodiments, the associative polymer improves dry strength of the paper sheet, wet strength or rewetted strength of the paper sheet, wet web strength of the paper sheet, or a combination thereof. Generally, dry strength is recognized as tensile strength exhibited by a dry paper sheet, typically conditioned under uniform humidity and room temperature conditions prior to testing. Wet strength, or rewetted strength, is recognized as tensile strength exhibited by a paper sheet that has been fully dried and then rewetted with water prior to testing. Wet web strength is recognized as the strength of a cellulosic fiber mat prior to drying to a paper product.

In certain embodiments, the associative polymer improves the dry strength of the paper sheet. The associative polymer can improve any suitable dry strength property of the paper sheet. For example, the polymer can improve the tensile strength, the STFI ratio, the burst index, the ring crush, or a combination thereof.

In some embodiments, the associative polymer increases the tensile strength (Nm/g), on average, by at least about 0.5% per 1 lb/ton actives. For example, the associative polymer can increase the tensile strength (Nm/g), on average, by at least about 1% per 1 lb/ton actives, at least about 2% per 1 lb/ton actives, at least about 3% per 1 lb/ton actives, at least about 4% per 1 lb/ton actives, or at least about 5% per 1 lb/ton actives. In some embodiments, the associative polymer increases the tensile strength (Nm/g), on average, by about 2% per 1 lb/ton actives. In certain embodiments, the associative polymer increases the tensile strength (Nm/g), on average, by about 3% per 1 lb/ton actives.

In some embodiments, the associative polymer increases the STFI ratio, on average, by at least about 0.5% per 1 lb/ton actives. For example, the associative polymer can increase the STFI ratio, on average, by at least about 1% per 1 lb/ton actives, at least about 2% per 1 lb/ton actives, at least about 3% per 1 lb/ton actives, at least about 4% per 1 lb/ton actives, or at least about 5% per 1 lb/ton actives. In some embodiments, the associative polymer increases the STFI ratio, on average, by about 2% per 1 lb/ton actives. In certain embodiments, the associative polymer increases the STFI ratio, on average, by about 3% per 1 lb/ton actives.

In some embodiments, the associative polymer increases the burst index (PSI 1,000 ft$^2$/lb), on average, by at least about 0.5% per 1 lb/ton actives. For example, the associative polymer can increase the burst index (PSI 1,000 ft$^2$/lb), on average, by at least about 1% per 1 lb/ton actives, at least about 2% per 1 lb/ton actives, at least about 3% per 1 lb/ton actives, at least about 4% per 1 lb/ton actives, or at least about 5% per 1 lb/ton actives. In some embodiments, the associative polymer increases the burst index (PSI 1,000 ft$^2$/lb), on average, by about 2% per 1 lb/ton actives. In certain embodiments, the associative polymer increases the burst index (PSI 1,000 ft$^2$/lb), on average, by about 3% per 1 lb/ton actives.

In some embodiments, the associative polymer increases the ring crush (kN/m), on average, by at least about 0.5% per 1 lb/ton actives. For example, the associative polymer can increase the ring crush (kN/m), on average, by at least about 1% per 1 lb/ton actives, at least about 2% per 1 lb/ton actives, at least about 3% per 1 lb/ton actives, at least about 4% per 1 lb/ton actives, or at least about 5% per 1 lb/ton actives. In some embodiments, the associative polymer increases the ring crush (kN/m), on average, by about 2% per 1 lb/ton actives. In certain embodiments, the associative polymer increases the ring crush (kN/m), on average, by about 3% per 1 lb/ton actives.

The associative polymer can improve the dry strength of any suitable paper product. In some embodiments, the associative polymer improves the dry strength of Kraft paper, tissue paper, testliner paper, duplex topside white paper, cardboard and shaped or molded paperboard, or a combination thereof. In certain embodiments, the associative polymer does not require a supplemental strength aid.

In some embodiments, the solution is used with any suitable conventional papermaking product. For example, the solution may be used along with one or more inorganic filler(s), dye(s), retention aid(s), drainage aid(s), sizing agent(s), coagulant(s), or combinations thereof.

In some embodiments, the solution is used with one or more inorganic filler(s). The inorganic filler can be any suitable inorganic filler, capable of increasing opacity or smoothness, decreasing the cost per mass of the paper, or combinations thereof. For example, the solution can be used with kaolin, chalk, limestone, talc, titanium dioxide, calcined clay, urea formaldehyde, aluminates, aluminosilicates, silicates, calcium carbonate (e.g., ground and/or precipitated), or combinations thereof.

In some embodiments, the solution is used with one or more dye(s). The dye can be any suitable dye, capable of controlling the coloration of paper. For example, the dye can be a direct dye, a cationic direct dye, acidic dye, basic dye, insoluble colored pigment, or combinations thereof.

In some embodiments, the solution is used with one or more drainage and/or retention aid(s). The drainage and/or retention aids can be any suitable drainage and/or retention aids, capable of helping to maintain efficiency and drainage of the paper machine, while improving uniformity, and retaining additives. For example, the drainage and/or retention aid can be a cationic polyacrylamide ("PAM") polymer, an anionic polyacrylamide ("PAM") polymer, a cationic polyethylenimine ("PEI") polymer, polyamines, ammonium-based polymers (e.g., polydiallyldimethylammonium chloride ("DADMAC"), colloidal silica, bentonite, polyethylene oxide ("PEO"), starch, polyaluminum sulfate, polyaluminum chloride, or combinations thereof.

In some embodiments, the solution is used with one or more sizing agent(s). The sizing agent can be any suitable sizing agent, capable of increasing the resistance to water and other liquids, exhibited by the paper sheet. For example, the sizing agent can be a rosin, alkenylsuccinic anhydride ("ASA"), alkylylketene dimer ("AKD"), or combinations thereof.

In some embodiments, the solution is used with one or more coagulant(s). The coagulant can be any suitable coagulant. As it relates to the present application, "coagulant" refers to a water treatment chemical used in a solid-liquid separation stage to neutralize charges of suspended particles so that the particles can agglomerate. Generally, coagulants may be categorized as cationic, anionic, amphoteric, or zwitterionic. Furthermore, coagulants may be categorized as inorganic coagulants, organic coagulants, and blends thereof. Exemplary inorganic coagulants include, e.g., aluminum or iron salts, such as aluminum sulfate, aluminum chloride, ferric chloride, ferric sulfate, polyaluminum chloride, and/or aluminum chloride hydrate. Exemplary organic coagulants include, e.g., diallyldimethylammonium chloride ("DADMAC"), dialkylaminoalkyl acrylate and/or a dialkylaminoalkyl methacrylate, or their quaternary or acid salts.

Additionally, a method of making down an associative polymer powder to form a solution is provided. The method comprises blending a mixture of the associative polymer powder, a cyclodextrin polymer, and a solvent to yield the solution, wherein the associative polymer powder comprises particles having been dry-cut to a median particle size of from about 200 microns to about 10,000 microns.

The method comprises blending a mixture of the associative polymer powder, the cyclodextrin polymer, and the solvent. As used herein, "blending" can refer to any process used to intersperse the associative polymer powder, the cyclodextrin polymer, and the solvent. For example, blending can mean mixing, stirring, whisking, shaking, or any combination thereof. Any apparatus, and/or make down unit can be used to blend the associative polymer powder, the cyclodextrin polymer, and the solvent. An exemplary make down unit for blending the associative polymer powder, the cyclodextrin polymer, and the solvent is an IKA T 25 digital ULTRA-TURRAX® high performance dispersing instrument, available from IKA® (Wilmington, N.C.).

The mixture of the associative polymer powder, the cyclodextrin polymer, and the solvent can be blended at any suitable rotor frequency. In some embodiments, the method comprises blending the mixture of the associative polymer powder, the cyclodextrin polymer, and the solvent with a rotor frequency of rotation of about 100 revolutions per min ("rpm") to about 20,000 rpm (e.g., about 100 rpm, about 200 rpm, about 300 rpm, about 400 rpm, about 600 rpm, about 800 rpm, about 1,000 rpm, about 2,000 rpm, about 3,000 rpm, about 4,000 rpm, about 5,000 rpm, about 6,000 rpm, about 7,000 rpm, about 8,000 rpm, about 9,000 rpm, about 10,000 rpm, about 11,000 rpm, about 12,000 rpm, about 13,000 rpm, about 14,000 rpm, about 15,000 rpm, about 16,000 rpm, about 17,000 rpm, about 18,000 rpm, about 19,000 rpm, or about 20,000 rpm). In some embodiments, the method comprises blending the mixture of the associative polymer powder, the cyclodextrin polymer, and the solvent with a rotor frequency of rotation of about 100 rpm to about 2,000 rpm. In certain embodiments, the method comprising blending the mixture of the associative polymer powder, the cyclodextrin polymer, and the solvent with a rotor frequency of rotation of about 400 rpm to about 2,000 rpm.

The mixture of the associative polymer powder, the cyclodextrin polymer, and the solvent can be blended for any period of time such that the period of time is sufficient to yield a solution. In some embodiments, the mixture of the associative polymer powder, the cyclodextrin polymer, and the solvent is blended for no more than 1 hour (e.g., no more than 45 minute, no more than 30 minutes, or no more than 15 minutes). In certain embodiments, the mixture of the associative polymer powder, the cyclodextrin polymer, and the solvent is blended for no more than about 15 minutes to yield the solution. For example, the mixture of the associative polymer powder, the cyclodextrin polymer, and the solvent can be blended for about 14 minutes to yield the solution, for example, about 13 minutes, about 12 minutes, about 11 minutes, about 10 minute, about 9 minutes, about 8 minutes, about 7 minutes, about 6 minutes, about 5 minutes, about 4 minutes, about 3 minutes, about 2 minutes, or about 1 minute. In some embodiments, the mixture of the associative polymer powder, the cyclodextrin polymer, and the solvent is blended for no more than about 10 minutes to yield the solution. In certain embodiments, the mixture of the associative polymer powder, the cyclodextrin polymer, and the solvent is blended for no more than about 5 minutes to yield the solution.

The level of dissolution of the associative polymer powder can be determined by any suitable method. Generally, the level of dissolution as provided herein is determined using the refractive index of the associative polymer powder solution/suspension. A fully made down associative polymer powder solution with known concentration can be obtained (at 25° C. and 1 atmosphere ("atm") of pressure) by mixing a predetermined amount of the associative polymer powder in a predetermined amount of water under shear with a cage stirrer at 400-800 rpm until the mixture of associative polymer powder and water can easily pass through 100-mesh screen with a trace amount of insoluble residue (<<0.05 wt. % of original powder added) left on the screen. An aliquot of the filtered made down associative polymer powder solution (i.e., filtrate) can be placed in the cell of a RM50 refractometer (Mettler Toledo), and the refractive index recorded. The refractive index of a made down associative polymer powder solution should be linearly correlated with the concentration of dissolved associative polymer in solution (see, for example, FIG. 1). Thus, a fully made down associative polymer powder solution can be considered the point when the refractive index reaches the appropriate refractive index value, within error (e.g., about ±5% of the expected value), on the linearly correlated associative polymer concentration curve. A similar method can be applied to the solution comprising an associative polymer, a cyclodextrin polymer, and a solvent to determine the point when the solution can be considered fully made down.

Figure 2:
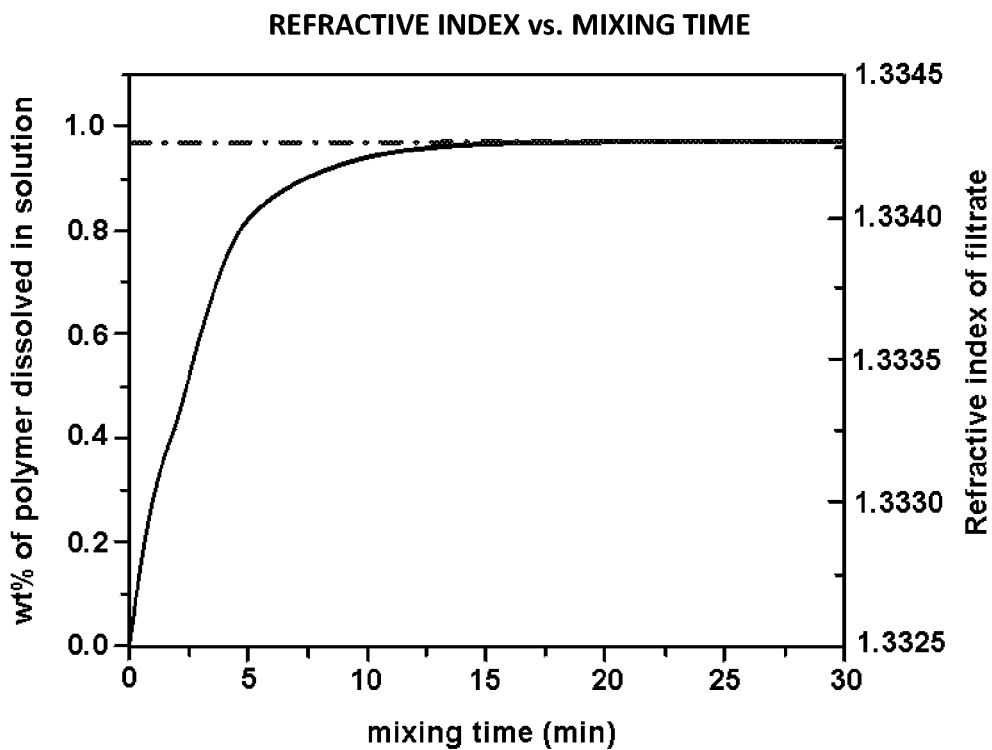
FIG. 2 graphically depicts a plateau of the refractive indices of associative polymer solutions in the absence of cyclodextrin polymer.

Similarly, the level of dissolution can be monitored as a function of time. An associative polymer powder suspension can be obtained (at 25° C. and 1 atmosphere ("atm") of pressure) by dispersing a predetermined amount of associative polymer powder into a predetermined amount of solvent (up to a 10 wt. % powder concentration). Upon dispersion, the associative polymer powder starts to hydrate but can take time to reach complete dissolution with sufficient mixing. Generally, a stable refractive index cannot be obtained for a associative polymer powder suspension due to its heterogeneous nature. However, the suspension can be filtered through a 100-mesh screen to remove any undissolved associative polymer powder, and the filtered associative polymer solution can be placed in the cell of a RM50 refractometer (Mettler Toledo), and the refractive index recorded. Using the refractive index of the filtrate, the concentration of the dissolved associative polymer in suspension can be calculated with a linear calibration curve (e.g., FIG. 1). To monitor the change of the refractive index and the concentration of dissolved associative powder during mixing of the associative polymer powder suspension, a small aliquot from the suspension can be removed at 30-second intervals and filtered through a 100-mesh screen. The filtrate aliquots can be placed on the cell of a RM50 refractometer (Mettler Toledo), and the refractive index recorded. Once the refractive index reaches a plateau, the associative polymer powder can be considered a fully made down associative polymer powder solution (see, for example, FIG. 2). A similar method can be applied to the solution comprising an associative polymer, a cyclodextrin polymer, and once the solution reaches a plateau, the solution powder can be considered fully made down.

The individual components of the solution, for example, the associative polymer, the cyclodextrin polymer, and the solvent are as defined by the parameters set forth herein.

The individual structures of the associative polymers, for example, the one or more associative monomer unit(s) and one or more monomer unit(s) selected from at least one of a cationic monomer unit, an anionic monomer unit, a nonionic monomer unit, a zwitterionic monomer unit, or a combination thereof, are as defined by the parameters set forth herein.

The individual structures of the cyclodextrin polymer, for example, the cyclodextrin monomer unit, are as defined by the parameters set forth herein.

In certain embodiments, the physical characteristics of the associative polymer powder are as defined by the parameters set forth herein.

The quantities of the individual components of the solution, for example, the associative polymer, the cyclodextrin polymer, and the solvent are as defined by the parameters set forth herein.

Additionally, a powder product is provided. The powder product comprises from about 80 wt. % to about 99.9 wt. % (e.g., about 85 wt. % to about 99.5 wt. %, about 90 wt. % to about 99 wt. %, about 92 wt. % to about 98 wt. %, or about 94 wt. % to about 97 wt. %) associative polymer powder; and from about 0.1 wt. % to about 20 wt. % (e.g., about 0.5 wt. % to about 15 wt. %, about 1 wt. % to about 10 wt. %, about 2 wt. % to about 8 wt. %, or about 3 wt. % to about 6 wt. %) of a cyclodextrin polymer.

The invention is further illustrated by the following embodiments.

(1) A solution comprising (a) an associative polymer, (b) a cyclodextrin polymer, and (c) a solvent.

(2) The solution of embodiment (1), wherein the associative polymer is of formula $AP_1$

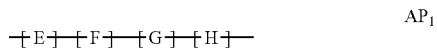

$$AP_1$$

wherein E is one or more associative monomer unit(s), F is one or more additional monomer unit(s), G is one or more monomer unit(s) derived from a monomer of Formula I, H is optionally present and is one or more piperidine-2,6-dione unit(s), wherein the one or more piperidine-2,6-dione(s) are formed upon cyclization of an acrylamide nitrogen of the monomer unit derived from a monomer of Formula I ("G") on a carbonyl of the additional monomer unit ("F").

(3) The solution of embodiment (2), wherein H is not present, and the associative polymer is of the formula $AP_2$:

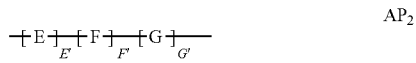

$$AP_2$$

wherein E is one or more associative monomer unit(s), E' is a mole percentage value of from about 0.005 to about 10, F is one or more additional monomer unit(s), F' is a mole percentage value of from about 0.005 to about 90, G is one or more monomer unit(s) derived from a monomer of Formula I, and G' is a mole percentage value of from about 10 to about 99.99.

(4) The solution of embodiment (2), wherein H is present, and the associative polymer is of the formula $AP_3$:

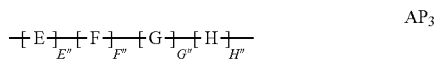

$$AP_3$$

wherein E is one or more associative monomer unit(s), E" is a mole percentage value of from about 0.005 to about 10, F is one or more additional monomer unit(s), F" is a mole percentage value of from about 0.005 to about 90, G is one or more monomer unit(s) derived from a monomer of Formula I, G" is a mole percentage value of from about 10 to about 99.99, H is one or more piperidine-2,6-dione unit(s), and H" is a mole percentage value of from about 0 (i.e., trace amounts) to about 10.

(5) The solution of any one of embodiments (1)-(4), wherein the associative polymer has a weight average molecular weight of from about 10 kDa to about 20,000 kDa.

(6) The solution of embodiment (5), wherein the associative polymer has a weight average molecular weight of from about 200 kDa to about 10,000 kDa.

(7) The solution of embodiment (6), wherein the associative polymer has a weight average molecular weight of from about 800 kDa to about 2,000 kDa.

(8) The solution of any one of embodiments (1)-(7), wherein the cyclodextrin polymer comprises a cyclodextrin monomer unit selected from α-cyclodextrin, β-cyclodextrin, γ-cyclodextrin, or a combination thereof.

(9) The solution of embodiment (8), wherein the cyclodextrin polymer comprises a β-cyclodextrin monomer unit.

(10) The solution of any one of embodiments (1)-(9), wherein the cyclodextrin polymer comprises a cyclodextrin monomer unit selected from any one or more of methyl, ethyl, propyl, vinyl, propenyl, acetyl, hydroxypropyl, and hydroxyethyl derivatives of α-cyclodextrin, β-cyclodextrin and γ-cyclodextrin, or a combination thereof.

(11) The solution of any one of embodiments (1)-(10), wherein the cyclodextrin polymer is a condensation reaction product of epichlorohydrin and a cyclodextrin monomer unit, a cyclodextrin derivative monomer unit, or a combinations thereof.

(12) The solution of any one of embodiments (1)-(11), wherein the solvent is water.

(13) The solution of any one of embodiments (1)-(12), wherein the molar ratio of the sum total cyclodextrin monomer units in the cyclodextrin polymer to the sum total of the one or more associative monomer unit(s) is from about 1:1 to about 50:1.

(14) The solution of embodiment (13), wherein the molar ratio of the sum total cyclodextrin monomer units in the cyclodextrin polymer to the sum total of the one or more associative monomer unit(s) is from about 2:1 to about 25:1.

(15) The solution of embodiment (14), wherein the molar ratio of the sum total cyclodextrin monomer units in the cyclodextrin polymer to the sum total of the one or more associative monomer unit(s) is from about 5:1 to about 10:1.

(16) The solution of any one of embodiments (1)-(15), wherein the associative polymer is a powder in the absence of the solvent.

(17) The solution of any one of embodiments (1)-(16), wherein a 1 wt. % associative polymer solution in water at 25° C. with a cyclodextrin polymer has a bulk viscosity (cP) of less than about 50% of a bulk viscosity of an identical solution without a cyclodextrin polymer, under otherwise identical concentrations and conditions.

(18) The solution of embodiment (17), wherein a 1 wt. % associative polymer solution in water at 25° C. with a cyclodextrin polymer has a bulk viscosity (cP) of less than about 35% of a bulk viscosity of an identical solution without a cyclodextrin polymer, under otherwise identical concentrations and conditions.

(19) The solution of embodiment (18), wherein a 1 wt. % associative polymer solution in water at 25° C. with a cyclodextrin polymer has a bulk viscosity (cP) of less than about 20% of a bulk viscosity of an identical solution without a cyclodextrin polymer, under otherwise identical concentrations and conditions.

(20) The solution of any one of embodiments (1)-(19), wherein the solution comprises from about 0.1 wt. % to about 10 wt. % of the associative polymer.

(21) The solution of embodiment 20), wherein the solution comprises from about 0.5 wt. % to about 5 wt. % of the associative polymer.

(22) The solution of embodiment (21), wherein the solution comprises from about 1 wt. % to about 4 wt. % of the associative polymer.

(23) A method of making down an associative polymer powder to form a solution, comprising blending an associative polymer powder, a cyclodextrin polymer, and a solvent to yield the solution, wherein the associative polymer powder comprises particles having been dry-cut to a median particle size of from about 200 microns to about 10,000 microns.

(24) The method of embodiment (23), wherein the associative polymer powder comprises an associative polymer of formula $AP_1$:

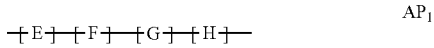

$AP_1$ wherein E is one or more associative monomer unit(s), F is one or more additional monomer unit(s), G is one or more monomer unit(s) derived from a monomer of Formula I, H is optionally present and is one or more piperidine-2,6-dione unit(s), wherein the one or more piperidine-2,6-dione(s) are formed upon cyclization of an acrylamide nitrogen of the monomer unit derived from a monomer of Formula I ("G") on a carbonyl of the additional monomer unit ("F").

(25) The method of embodiment (24), wherein H is not present, and the associative polymer is of the formula $AP_2$:

$AP_2$ wherein E is one or more associative monomer unit(s), E' is a mole percentage value of from about 0.005 to about 10, F is one or more additional monomer unit(s), F' is a mole percentage value of from about 0.005 to about 90, G is one or more monomer unit(s) derived from a monomer of Formula I, and G' is a mole percentage value of from about 10 to about 99.99.

(26) The method of embodiment (24), wherein H is present, and the associative polymer is of the formula $AP_3$:

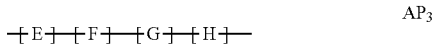

$AP_3$ wherein E is one or more associative monomer unit(s), E" is a mole percentage value of from about 0.005 to about 10, F is one or more additional monomer unit(s), F" is a mole percentage value of from about 0.005 to about 90, G is one or more monomer unit(s) derived from a monomer of Formula I, G" is a mole percentage value of from about 10 to about 99.99, H is one or more piperidine-2,6-dione unit(s), and H" is a mole percentage value of from about 0 (i.e., trace amounts) to about 10.

(27) The method of any one of embodiments (23)-(26), wherein the associative polymer has a weight average molecular weight of from about 10 kDa to about 20,000 kDa.

(28) The method of embodiment (27), wherein the associative polymer has a weight average molecular weight of from about 200 kDa to about 10,000 kDa.

(29) The method of embodiment (28), wherein the associative polymer has a weight average molecular weight of from about 800 kDa to about 2,000 kDa.

(30) The method of any one of embodiments (23)-(29), wherein the cyclodextrin polymer comprises a cyclodextrin monomer unit selected from α-cyclodextrin, β-cyclodextrin, γ-cyclodextrin, or a combination thereof.

(31) The method of embodiment (30), wherein the cyclodextrin polymer comprises a β-cyclodextrin monomer unit.

(32) The method of any one of embodiments (23)-(31), wherein the cyclodextrin polymer comprises a cyclodextrin monomer unit selected from any one or more of methyl, ethyl, propyl, vinyl, propenyl, acetyl, hydroxypropyl, and hydroxyethyl derivatives of α-cyclodextrin, β-cyclodextrin and γ-cyclodextrin, or a combination thereof.

(33) The method of any one of embodiments (23)-(32), wherein the cyclodextrin polymer is a condensation reaction product of epichlorohydrin and a cyclodextrin monomer unit, a cyclodextrin derivative monomer unit, or a combinations thereof.

(34) The method of any one of embodiments (23)-(33), wherein the solvent is water.

(35) The method of any one of embodiments (23)-(34), wherein the molar ratio of the sum total cyclodextrin monomer units in the cyclodextrin polymer to the sum total of the one or more associative monomer unit(s) is from about 1:1 to about 50:1.

(36) The method of embodiment (35), wherein the molar ratio of the sum total cyclodextrin monomer units in the cyclodextrin polymer to the sum total of the one or more associative monomer unit(s) is from about 2:1 to about 25:1.

(37) The method of embodiment (36), wherein the molar ratio of the sum total cyclodextrin monomer units in the cyclodextrin polymer to the sum total of the one or more associative monomer unit(s) is from about 5:1 to about 10:1.

(38) The method of any one of embodiments (23)-(37), wherein the associative polymer is a powder in the absence of the solvent.

(39) The method of any one of embodiments (23)-(38), wherein the particles have a median particle size of from about 350 microns to about 10,000 microns.

(40) The method of embodiment (39), wherein the particles have a median particle size of from about 500 microns to about 10,000 microns.

(41) The method of any one of embodiments (23)-(40), wherein the mixture of the powder and the solvent is blended for no more than about 1 hour to yield the solution.

(42) The method of embodiment (41), wherein the mixture of the powder and the solvent is blended for no more than about 30 minutes to yield the solution.

(43) The method of any one of embodiments (23)-(42), wherein a 1 wt. % associative polymer solution in water at 25° C. with a cyclodextrin polymer has a bulk viscosity (cP) of less than about 50% of a bulk viscosity of an identical solution without a cyclodextrin polymer, under otherwise identical concentrations and conditions.

(44) The method of embodiment (43), wherein a 1 wt. % associative polymer solution in water at 25° C. with a cyclodextrin polymer has a bulk viscosity (cP) of less than about 35% of a bulk viscosity of an identical solution without a cyclodextrin polymer, under otherwise identical concentrations and conditions.

(45) The method of embodiment (44), wherein a 1 wt. % associative polymer solution in water at 25° C. with a cyclodextrin polymer has a bulk viscosity (cP) of less than about 20% of a bulk viscosity of an identical solution without a cyclodextrin polymer, under otherwise identical concentrations and conditions.

(46) The method of any one of embodiments (23)-(45), wherein the solution comprises from about 0.1 wt. % to about 10 wt. % of the associative polymer.

(47) The method of embodiment (46), wherein the solution comprises from about 0.5 wt. % to about 5 wt. % of the associative polymer.

(48) The method of embodiment (47), wherein the solution comprises from about 1 wt. % to about 4 wt. % of the associative polymer.

(49) A powder product comprising from about 80 wt. % to about 99.9 wt. % associative polymer powder; and from about 0.1 wt. % to about 20 wt. % of a cyclodextrin polymer.

(50) The powder product of claim (49) comprising: from about 90 wt. % to about 99 wt. % associative polymer powder; and from about 1 wt. % to about 10 wt. % of the cyclodextrin polymer.

(51) The powder product of claim (49) or (50), wherein the associative polymer powder comprises an associative polymer of formula $AP_1$:

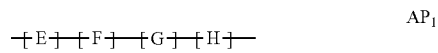

$AP_1$ wherein E is one or more associative monomer unit(s), F is one or more additional monomer unit(s), G is one or more monomer unit(s) derived from a monomer of Formula I, H is optionally present and is one or more piperidine-2,6-dione unit(s), wherein the one or more piperidine-2,6-dione(s) are formed upon cyclization of an acrylamide nitrogen of the monomer unit derived from a monomer of Formula I ("G") on a carbonyl of the additional monomer unit ("F").

(52) The powder product of claim (51), wherein H is not present, and the associative polymer is of the formula $AP_2$:

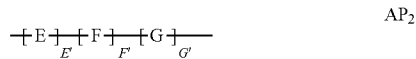

$AP_2$ wherein E is one or more associative monomer unit(s), E' is a mole percentage value of from about 0.005 to about 10, F is one or more additional monomer unit(s), F' is a mole percentage value of from about 0.005 to about 90, G is one or more monomer unit(s) derived from a monomer of Formula I, and G' is a mole percentage value of from about 10 to about 99.99.

(53) The powder product of claim (51), wherein H is present, and the associative polymer is of the formula $AP_3$:

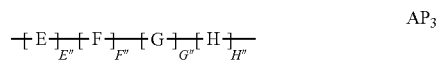

$AP_3$ wherein E is one or more associative monomer unit(s), E" is a mole percentage value of from about 0.005 to about 10, F is one or more additional monomer unit(s), F" is a mole percentage value of from about 0.005 to about 90, G is one or more monomer unit(s) derived from a monomer of Formula I, G" is a mole percentage value of from about 10 to about 99.99, H is one or more piperidine-2,6-dione unit(s), and H" is a mole percentage value of from about 0 (i.e., trace amounts) to about 10.

(54) The powder product of any one of claims (49)-(53), wherein the associative polymer has a weight average molecular weight of from about 10 kDa to about 20,000 kDa.

(55) The powder product of claim (54), wherein the associative polymer has a weight average molecular weight of from about 200 kDa to about 10,000 kDa.

(56) The powder product of claim (55), wherein the associative polymer has a weight average molecular weight of from about 800 kDa to about 2,000 kDa.

(57) The powder product of any one of claims (49)-(56), wherein the cyclodextrin polymer comprises a cyclodextrin monomer unit selected from α-cyclodextrin, β-cyclodextrin, γ-cyclodextrin, or a combination thereof.

(58) The powder product of claim (57), wherein the cyclodextrin polymer comprises a β-cyclodextrin monomer unit.

(59) The powder product of any one of claims (49)-(58), wherein the cyclodextrin polymer comprises a cyclodextrin monomer unit selected from any one or more of methyl, ethyl, propyl, vinyl, propenyl, acetyl, hydroxypropyl, and hydroxyethyl derivatives of α-cyclodextrin, β-cyclodextrin and γ-cyclodextrin, or a combination thereof.

(60) The powder product of any one of claims (49)-(59), wherein the cyclodextrin polymer is a condensation reaction product of epichlorohydrin and a cyclodextrin monomer unit, a cyclodextrin derivative monomer unit, or a combinations thereof.

(61) The powder product of any one of claims (49)-(60), wherein the molar ratio of the sum total cyclodextrin monomer units in the cyclodextrin polymer to the sum total of the one or more associative monomer unit(s) is from about 1:1 to about 50:1.

(62) The powder product of claim (61), wherein the molar ratio of the sum total cyclodextrin monomer units in the cyclodextrin polymer to the sum total of the one or more associative monomer unit(s) is from about 2:1 to about 25:1.

(63) The powder product of claim (62), wherein the molar ratio of the sum total cyclodextrin monomer units in the cyclodextrin polymer to the sum total of the one or more associative monomer unit(s) is from about 5:1 to about 10:1.

The following examples further illustrate the invention but, of course, should not be construed as in any way limiting its scope.

EXAMPLES

Table 1 sets forth the polymer formulas for the polymers used in the following examples.

TABLE 1

| Polymer | Polymer Formula | Structure | IV at pH 12 (dL/g) |
|---|---|---|---|
| 1 (Linear) | 20/80 mol % DMAEA.MCQ/acrylamide | latex liquid | 10.9 |
| 2 (Linear) | 20/80 mol % DMAEA.MCQ/acrylamide | dry solid | 10.2 |
| 3 (Associative) | 20/0.01/79.99 mol % DMAEA.MCQ/ C18PEG1105MA/acrylamide | dry solid | 10.3 |
| 4 (Associative) | 10/0.035/89.965 mol % DMAEA.MCQ/ C18PEG1105MA/acrylamide | dry solid | 3.4 |

Polymer 1 (comparative) is a commercially available linear, 20 mol % cationic flocculant polymer produced in latex form with an intrinsic viscosity of 10.9 dL/g at pH 12 in 1N sodium nitrate solution at 30° C. The weight average molecular weight was estimated at $3.1 \times 10^6$ g/mole using the Mark-Houwink equation.

Polymer 2 (comparative) comprising 20/80 mol % DMAEA.MCQ/acrylamide was synthesized in the following manner:

An 1,000 g aqueous solution at pH 2-5 containing 41 wt. % monomer mixture of 20/80 mol % DMAEA.MCQ/acrylamide, azo initiator, chain transfer agent, buffer agent, and chelant was chilled to approximately −5° C. and de-gassed with nitrogen. Polymerization was initiated with a pair of redox agents and proceeded adiabatically until the conversion of monomer reached more than 99.99%. The resulting polymer gel was too soft and sticky to be processed with the aid of 1 wt. % (relative to weight of polymer gel) petroleum oil based lubricant in a cutting mill (Restch Mill Cutter) at 1500 rpm. The resulting polymer gel was manually divided into small pieces on a tray and dried in an oven at 85° C. to remove the moisture and then ground to powder. The intrinsic viscosity of Polymer 2 was 10.2 dL/g at pH 12 in 1N sodium nitrate solution at 30° C. The weight average molecular weight was estimated at $2.8 \times 10^6$ g/mole using the Mark-Houwink equation.

Polymer 3 (associative) comprising 79.99/0.01/20 mol % DMAEA.MCQ/C18PEG1105MA/acrylamide was synthesized in the following manner:

An 1,000 g aqueous solution at pH 2-5 containing 41 wt. % monomer mixture of 79.99/0.01/20 mol % DMAEA.MCQ/C18PEG1105MA (VISIOMER® monomer; 55% active; Evonik Industries, Essen, Germany)/acrylamide, azo initiator, chain transfer agent, buffer agent, and chelant was chilled to approximately −5° C. and de-gassed with nitrogen. Polymerization was initiated with a pair of redox agents and proceeded adiabatically until the conversion of monomer reached more than 99.99%. The resulting wet gel, which maintained a taffy like consistency and was not sticky, was marginally processed with the aid of 1 wt. % (relative to weight of polymer gel) petroleum oil based lubricant in a cutting mill (Retsch Mill Cutter) at 1500 rpm to form granules. The wet gel granules were dried in a mesh tray in an oven at 85° C. to decrease the moisture content to about 10 wt. % and then ground to powder having an intrinsic viscosity of 10.3 dg/L at pH 12 in 1N sodium nitrate solution at 30° C. The weight average molecular weight was estimated at $2.9 \times 10^6$ g/mole using the Mark-Houwink equation.

Polymers 1-3 have a similar molecular weight, characterized by the similar intrinsic viscosity at pH 12.

Polymer 4 (associative) comprising 10/0.035/89.965 mol % DMAEA.MCQ/C18PEG1105MA/acrylamide was synthesized in the following manner:

An 1,000 g aqueous solution at pH 2-5 containing 37 wt. % monomer mixture of 10/0.035/89.965 mol % DMAEA.MCQ/C18PEG1105MA (VISIOMER® monomer; 55% active; Evonik Industries, Essen, Germany)/acrylamide, azo initiator, chain transfer agent, buffer agent, and chelant was chilled to approximately −5° C. and de-gassed with nitrogen. Polymerization was initiated with a pair of redox agents and proceeded adiabatically until the conversion of monomer reached more than 99.99%. The resulting wet gel, which maintained a taffy like consistency and was not sticky, was marginally processed with the aid of 1 wt. % (relative to weight of polymer gel) petroleum oil based lubricant in a cutting mill (Retsch Mill Cutter) at 1500 rpm to form granules. The wet gel granules were dried in a mesh tray in an oven at 85° C. to decrease the moisture content to about 10 wt. % and then ground to powder having an intrinsic viscosity of 3.4 dg/L at pH 12 in 1 N sodium nitrate solution at 30° C. The weight average molecular weight of Polymer 4 was lower than Polymers 1-3, as evidenced by intrinsic viscosity, and was determined to be $0.84 \times 10^6$ g/mol using size exclusion chromatography.

Table 2 sets forth the polymer solutions used in the following examples.

TABLE 2

| Solution | Components | Bulk Viscosity (cPs) |
|---|---|---|
| 1 (Comparative) | 0.5 wt.% Polymer 1 in synthetic tap water | 585 |
| 2 (Comparative) | 0.5 wt.% Polymer 2 in synthetic tap water | 606 |
| 3 (Comparative) | 0.5 wt.% Polymer 3 in synthetic tap water | 983 |
| 4 (Inventive) | 0.5 wt. % Polymer 3 and 0.005 wt. % cyclodextrin polymer in synthetic tap water | 719 |
| 5 (Comparative) | 1 wt.% Polymer 4 in deionized water | 876 |
| 6 (Comparative) | 1 wt. % Polymer 4 and 0.011 wt. % cyclodextrin monomer in deionized water | 561 |
| 7 (Inventive) | 1 wt. % Polymer 4 and 0.018 wt. % cyclodextrin polymer in deionized water | 160 |

Solution 3 was prepared by mixing 1 g Polymer 3 and 199 g synthetic tap water with a cage stirrer at 800 rpm for one hour. As used in the Examples, synthetic tap water contains 0.9 mM $Ca^{2+}$, 0.4 mM me, and 2.7 mM $Cl^-$ with a pH of 8 and a conductivity of about 400 μS.

Solution 4 was prepared by mixing 1 g Polymer 3, 0.5 g of a 2 wt. % cyclodextrin polymer ("polycyclodextrin") solution, and 198.5 g synthetic tap water with a cage stirrer at 800 rpm for one hour. The resulting solution contains a 5:1 molar ratio of cyclodextrin in polycyclodextrin to C18PEG1105MA monomer.

Solution 5 was prepared by mixing 2 g Polymer 4, 198 g deionized water with a cage stirrer at 400 rpm for one hour.

Solution 6 was prepared by mixing 2 g Polymer 4, 1.8 g of a 1.2 wt. % cyclodextrin monomer ("monocyclodextrin") solution, and 196.2 g deionized water with a cage stirrer at 400 rpm for one hour. The resulting solution contains a 5:1 molar ratio of cyclodextrin in monocyclodextrin to C18PEG1105MA monomer.

Solution 7 was prepared by mixing 2 g Polymer 4, 1.8 g of a 2 wt. % cyclodextrin polymer ("polycyclodextrin") solution, and 196.2 g deionized water with a cage stirrer at 400 rpm for one hour. The resulting solution contains a 5:1 molar ratio of cyclodextrin in polycyclodextrin to C18PEG1105MA monomer.

Example 1

This example demonstrates the effect on vacuum drainage performance exhibited by a paper furnish treated with a solution comprising an associative polymer and a cyclodextrin polymer, as measured by drainage time reduction (%).

Solutions 1-4 were prepared and dosed at various concentrations into a dilute furnish received from a paper mill. This furnish was then drained through a screen and the drainage time was measured. The percent reduction in drainage time was measured relative to the drainage time of a dilute furnish that had not been treated. Accordingly, higher drainage time reduction (%) corresponds to better drainage performance. The drainage time reduction (%) results set forth in FIG. 3.

Figure 3:
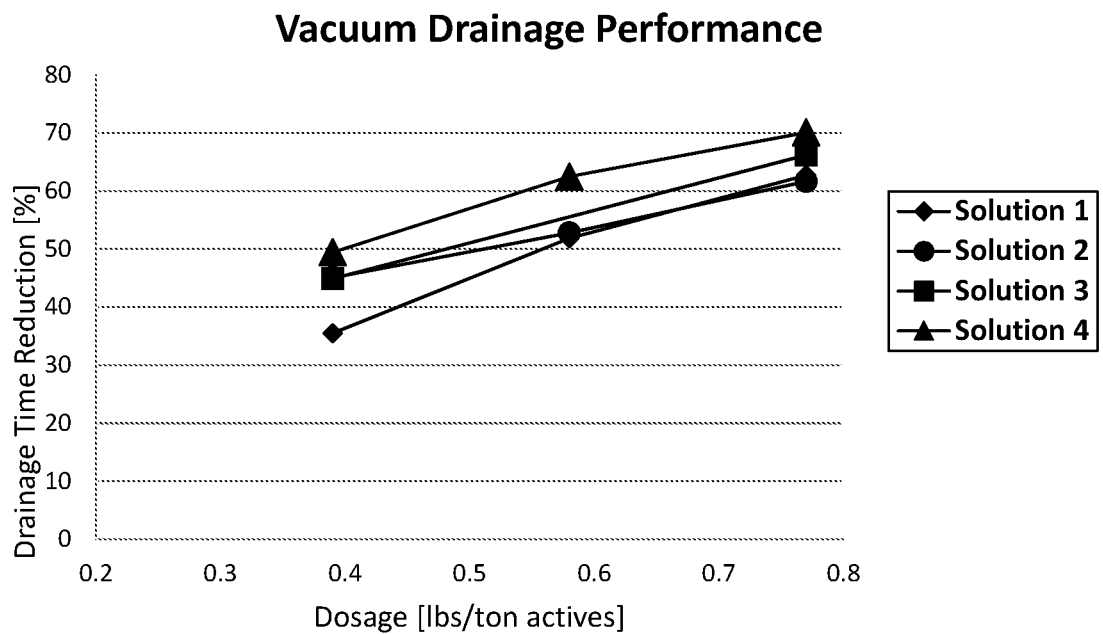
FIG. 3 graphically depicts the results of Example 1.

As demonstrated by FIG. 3, Solutions 3 and 4, comprising associative Polymer 3 outperformed Solutions 1 and 2 in drainage time reduction (%). FIG. 3 also shows that Solution 4, comprising associative Polymer 3 and a cyclodextrin polymer outperformed Solutions 1-3 at all dosages.

Example 2

This example demonstrates the effect on paper dry strength exhibited by a sheet of paper treated with a solution comprising an associative polymer and a cyclodextrin polymer, as measured by STFI ratio.

Solutions 5-7 were prepared and dosed at various concentrations (dosages of 0, 4, and 6 lbs/ton actives) into cellulose fiber slurry. The treated fibers were then added to a handsheet mold and drained through a screen to form wet fiber pads. The pads were couched from the screen, pressed, and dried to yield finished paper sheets. The sheets were tested for compressive strength (STFI ratio) and the results set forth in FIG. 4.

Figure 4:
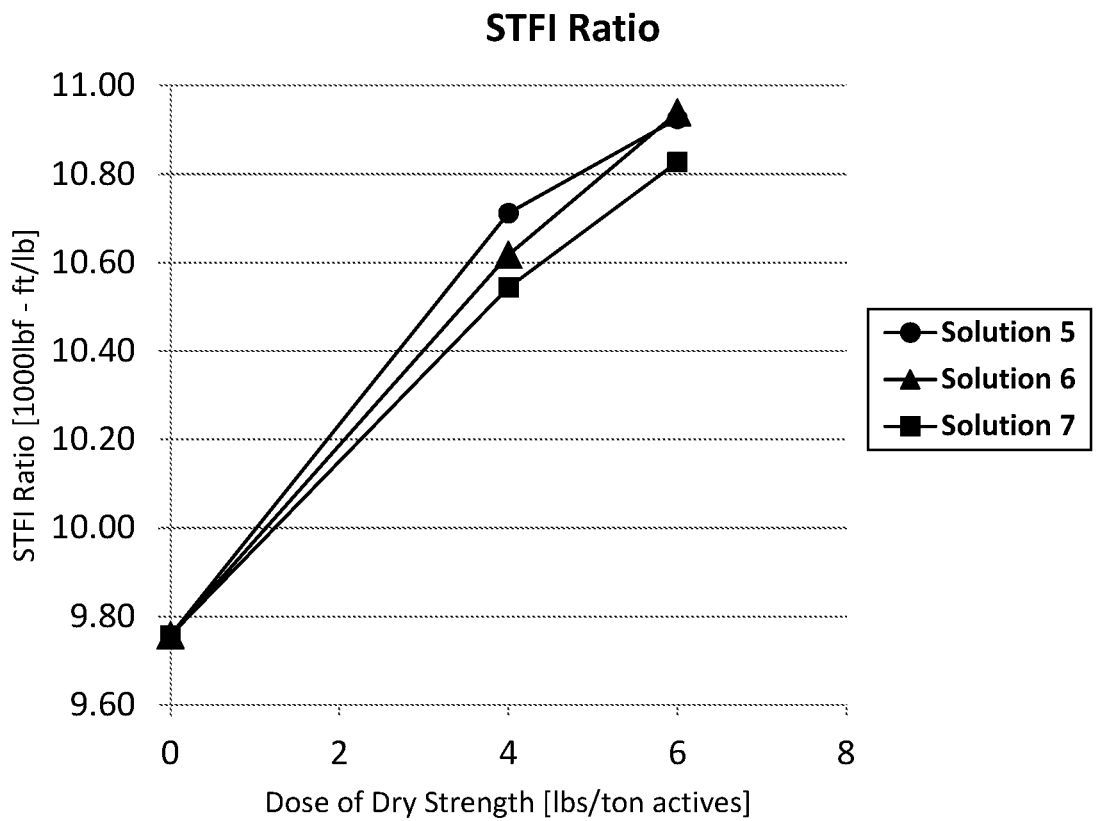
FIG. 4 graphically depicts the results of Example 2.

As shown by FIG. 4, Solutions 5-7, comprising an associative polymer, provide improved compressive strength properties relative to a paper street that has not been treated with an associative polymer. The results set forth in FIG. 4 also demonstrate that the cyclodextrin polymer does not negatively affect the STFI ratio exhibited by a sheet of paper treated with a solution comprising an associative polymer.

Example 3

This example demonstrates the effect on paper dry strength exhibited by a sheet of paper treated with a solution comprising an associative polymer and a cyclodextrin polymer, as measured by ring crush index.

Solutions 5-7 were prepared and dosed at various concentrations (dosages of 0, 4, and 6 lbs/ton actives) into cellulose fiber slurry. The treated fibers were then added to a handsheet mold and drained through a screen to form wet fiber pads. The pads were couched from the screen, pressed, and dried to yield finished paper sheets. The sheets were tested for compressive strength (ring crush index) and the results set forth in FIG. 5.

Figure 5:
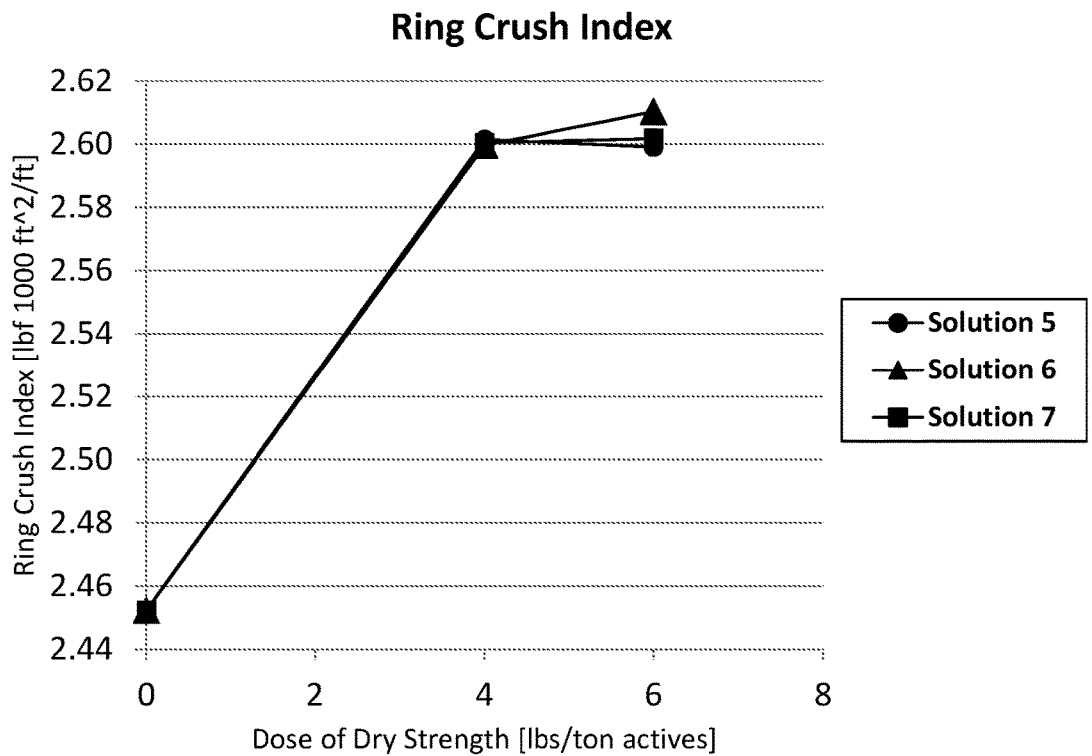
FIG. 5 graphically depicts the results of Example 3.

As shown by FIG. 5, Solutions 5-7, comprising an associative polymer, provide improved compressive strength properties relative to a paper street that has not been treated with an associative polymer. The results set forth in FIG. 5 also demonstrate that the cyclodextrin polymer does not negatively affect the ring crush index exhibited by a sheet of paper treated with a solution comprising an associative polymer.

Example 4

This example demonstrates the effect on bulk viscosity (cPs) exhibited by a solution in deionized water comprising an associative polymer and monocyclodextrin ("monoCD") or polycyclodextrin ("polyCD").

In addition to Solutions 5-7, six different solutions containing polycyclodextrin or monocyclodextrin in molar ratios of 2, 9, and 19 relative to the C18PEG1105MA monomer were prepared using the same procedure. The bulk viscosity was determined on a Brookfield viscometer (Brookfield Ametek®, Middleboro, Ma) equipped with Spindle 2 at 30 rpm and the results set forth in FIG. 6.

Figure 6:
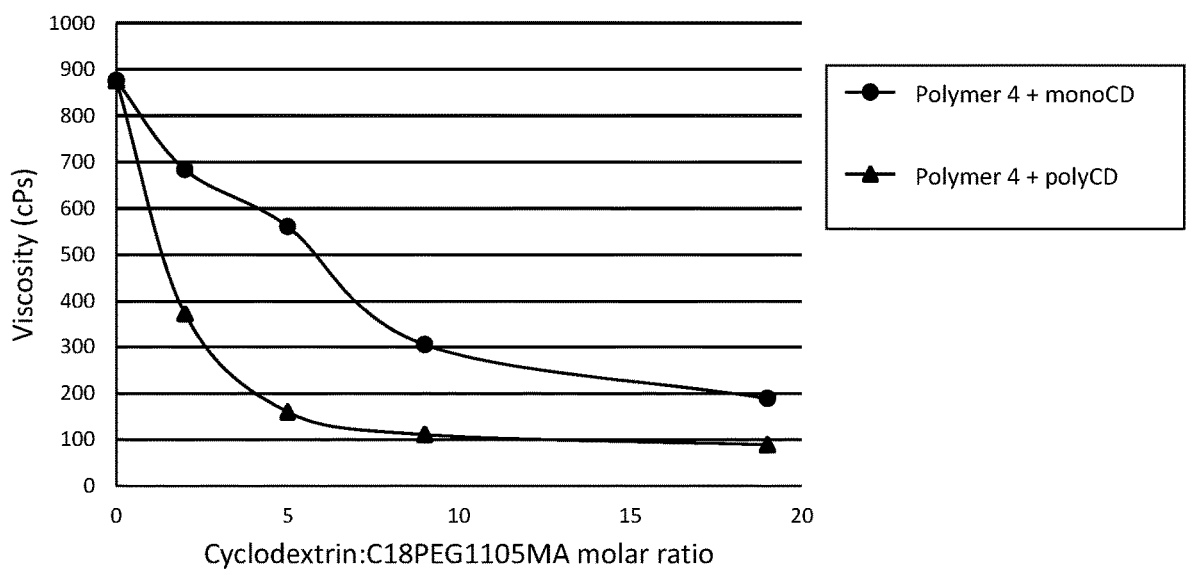
FIG. 6 graphically depicts the results of Example 4.

As demonstrated by FIG. 6, solutions containing cyclodextrin reduced the bulk viscosity of a 1 wt. % associative polymer solution relative to an 1 wt. % associative polymer solution not containing cyclodextrin. FIG. 6 also shows solutions containing polycyclodextrin had significantly lower viscosities than solutions containing monocyclodextrin at all molar ratios measured.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A solution comprising:
   (a) an associative polymer,
   (b) a cyclodextrin polymer, and
   (c) a solvent, wherein the associative polymer is of formula $AP_3$:

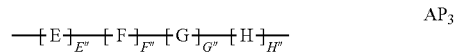

$$AP_3$$

wherein E is one or more associative monomer unit(s), E" is a mole percentage value of from about 0.005 to about 10, F is one or more additional monomer unit(s), F" is a mole percentage value of from about 0.005 to about 90, G is one or more monomer unit(s) derived from a monomer of Formula I, G" is a mole percentage value of from about 10 to about 99.99, H is one or more piperidine-2,6-dione unit(s), and H" is a mole percentage value of from about 0 (i.e., trace amounts) to about 10,

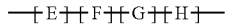

AP₁ wherein Formula I is:

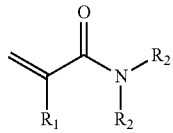

I wherein $R_1$ is H or $C_1$-$C_4$ alkyl, and each $R_2$ is independently H or an organic group.

2. The solution of claim 1, wherein the associative polymer has a weight average molecular weight of from about 10 kDa to about 20,000 kDa.

3. The solution of claim 1, wherein the cyclodextrin polymer comprises a cyclodextrin monomer unit selected from α-cyclodextrin, β-cyclodextrin, γ-cyclodextrin, or a combination thereof.

4. The solution of claim 1, wherein the cyclodextrin polymer comprises a cyclodextrin monomer unit selected from any one or more of methyl, ethyl, propyl, vinyl, propenyl, acetyl, hydroxypropyl, and hydroxyethyl derivatives of α-cyclodextrin, β-cyclodextrin and γ-cyclodextrin, or a combination thereof.

5. The solution of claim 1, wherein the molar ratio of the sum total cyclodextrin monomer units in the cyclodextrin polymer to the sum total of associative monomer units in the associative polymer is from about 1:1 to about 50:1, optionally wherein the solvent is water.

6. The solution of claim 1, wherein the solution comprises from about 0.1 wt. % to about 10 wt. % of the associative polymer.

7. A powder product comprising:
from about 80 wt. % to about 99.9 wt. % associative polymer powder; and
from about 0.1 wt. % to about 20 wt. % of a cyclodextrin polymer,
wherein the associative polymer powder comprises an associative polymer of formula AP₁:

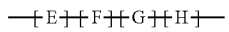

AP₁ wherein E is one or more associative monomer unit(s), F is one or more additional monomer unit(s), G is one or more monomer unit(s) derived from a monomer of Formula I, H is optionally present and is one or more piperidine-2,6-dione unit(s),
wherein the one or more piperidine-2,6-dione(s) are formed upon cyclization of an acrylamide nitrogen of the monomer unit derived from a monomer of Formula I ("G") on a carbonyl of the additional monomer unit ("F"), wherein Formula I is:

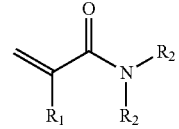

I wherein $R_1$ is H or $C_1$-$C_4$ alkyl, and each $R_2$ is independently H or an organic group.

8. The powder product of claim 7 comprising:
from about 90 wt. % to about 99 wt. % associative polymer powder; and
from about 1 wt. % to about 10 wt. % of the cyclodextrin polymer.

9. The powder product of claim 7, wherein H is not present, and the associative polymer is of the formula AP₂:

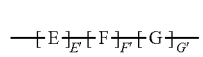

AP₂ wherein E is one or more associative monomer unit(s), E' is a mole percentage value of from about 0.005 to about 10, F is one or more additional monomer unit(s), F' is a mole percentage value of from about 0.005 to about 90, G is one or more monomer unit(s) derived from a monomer of Formula I, and G' is a mole percentage value of from about 10 to about 99.99.

10. The powder product of claim 7, wherein H is present, and the associative polymer is of the formula AP₃:

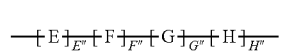

AP₃ wherein E is one or more associative monomer unit(s), E" is a mole percentage value of from about 0.005 to about 10, F is one or more additional monomer unit(s), F'" is a mole percentage value of from about 0.005 to about 90, G is one or more monomer unit(s) derived from a monomer of Formula I, G" is a mole percentage value of from about 10 to about 99.99, H is one or more piperidine-2,6-dione unit(s), and H" is a mole percentage value of from about 0 (i.e., trace amounts) to about 10.

11. The powder product of claim 7, wherein the associative polymer has a weight average molecular weight of from about 10 kDa to about 20,000 kDa.

12. The powder product of claim 7, wherein the cyclodextrin polymer comprises a cyclodextrin monomer unit selected from α-cyclodextrin, β-cyclodextrin, γ-cyclodextrin, or a combination thereof.

13. The powder product of claim 7, wherein the molar ratio of the sum total cyclodextrin monomer units in the cyclodextrin polymer to the sum total of associative monomer units in the associative polymer is from about 1:1 to about 50:1.

* * * * *